(12) United States Patent
Aygül et al.

(10) Patent No.: US 12,732,288 B2
(45) Date of Patent: Sep. 8, 2026

(54) METHODS AND APPARATUSES FOR SENSING APPLICATION IDENTIFICATION AND PREDICTION

(71) Applicant: Vestel Elektronik Sanayi ve Ticaret A. S., Manisa (TR)

(72) Inventors: Mehmet Ali Aygül, Istanbul (TR); Halise Türkmen, Istanbul (TR); Hüseyin Arslan, Istanbul (TR)

(73) Assignee: Vestel Elektronik Sanayi ve Ticaret A. S., Manisa (TR)

( * ) Notice: Subject to any disclaimer, the term of this patent is extended or adjusted under 35 U.S.C. 154(b) by 460 days.

(21) Appl. No.: 18/272,863

(22) PCT Filed: Dec. 23, 2021

(86) PCT No.: PCT/EP2021/087571

§ 371 (c)(1), (2) Date: Jul. 18, 2023

(87) PCT Pub. No.: WO2022/156996

PCT Pub. Date: Jul. 28, 2022

(65) Prior Publication Data

US 2024/0305390 A1 Sep. 12, 2024

(30) Foreign Application Priority Data

Jan. 19, 2021 (EP) .................................... 21152374

(51) Int. Cl.
*H04B 17/327* (2015.01)
*H04B 17/373* (2015.01)
(Continued)

(52) U.S. Cl.
CPC ......... *H04B 17/327* (2015.01); *H04B 17/373* (2015.01)

(58) Field of Classification Search
None
See application file for complete search history.

(56) References Cited

U.S. PATENT DOCUMENTS 9,392,508 B2 * 7/2016 Senarath ........... H04W 36/0072
9,887,768 B1 * 2/2018 Thommana .......... H04B 17/391
(Continued)

FOREIGN PATENT DOCUMENTS

WO 2015017463 A2 2/2015

OTHER PUBLICATIONS

Aygul et al., "Efficient Spectrum Occupancy Prediction Exploiting Multidimensional Correlations through Composite 2D-LSTM Models", Sensors, 2021, pp. 1-18, vol. 21:135.
(Continued)

*Primary Examiner* — Duc T Duong
(74) *Attorney, Agent, or Firm* — The Webb Law Firm

(57) ABSTRACT

Some embodiments in the present disclosure relate to sensing application identification. For example, a wireless signal is obtained to be further processed. Then, presence of a sensing signal in the received signal is estimated, the sensing signal being a signal generated by a sensing application. Based on the estimation of the sensing signal, wireless reception, transmission or sensing is then performed. The sensing application detection and/or identification may be performed by a trained model such as machine learning based model. The wireless reception, transmission or sensing performed according to the result of the estimation may further include channel access, resource allocation, utilization of the detected sensing signal for own sensing purposes, or the like.

14 Claims, 7 Drawing Sheets

(51) Int. Cl.
*H04W 16/14* (2009.01)
*H04W 72/12* (2023.01)

(56) References Cited

U.S. PATENT DOCUMENTS 10,390,364 B2 * 8/2019 Hall .................... H04W 74/006
11,272,375 B2 * 3/2022 Sahoo ................... H04W 24/02
2009/0247201 A1 * 10/2009 Ye ......................... H04W 16/14 455/509
2012/0155318 A1 * 6/2012 Zhang ................... H04W 16/14 370/252
2013/0072192 A1 * 3/2013 Xu ..................... H04B 7/15542 455/11.1
2018/0126241 A1 * 5/2018 Hung ...................... G06F 3/011
2020/0003886 A1 * 1/2020 Cho ........................ G01S 13/58
2021/0068108 A1 * 3/2021 Furuichi ........... H04W 72/0453
2021/0286045 A1 * 9/2021 Bayesteh ............. H04B 7/0695
2022/0031174 A1 * 2/2022 Jeong ..................... A61B 5/308
2023/0209325 A1 * 6/2023 Lee .......................... G06N 3/09 370/338
2024/0063927 A1 * 2/2024 Yoon .................... H04B 17/309
2024/0077584 A1 * 3/2024 Yoo ......................... G01S 7/006

OTHER PUBLICATIONS

Aygul et al., "Spectrum Occupancy Prediction Exploiting Time and Frequency Correlations Through 2D-LSTM", 2020 IEEE 91st Vehicular Technology Conference, 2020, pp. 1-5.

Ma et al., "WiFi Sensing with Channel State Information: A Survey", ACM Computing Surveys, Jun. 2019, pp. 1-36, vol. 52:3, Article 46.

Selim et al., "Spectrum Monitoring for Radar Bands using Deep Convolutional Neural Networks", 2017 IEEE Global Communications Conference, 2017, pp. 1-6.

Aygul, M. A (Vestel, Imu), "Learning based spectrum occupancy prediction exploiting multi-dimensional correlations", IEEE 802. 11-20/1709r3, IEEE, Nov. 3, 2020.

* cited by examiner

METHODS AND APPARATUSES FOR SENSING APPLICATION IDENTIFICATION AND PREDICTION

CROSS-REFERENCE TO RELATED APPLICATIONS

This application is the United States national phase of International Application No. PCT/EP2021/087571, filed Dec. 23, 2021, and claims priority to European Patent Application No. 21152374.1, filed Jan. 19, 2021, the disclosures of each of which are hereby incorporated by reference in their entireties.

BACKGROUND

Field

The present disclosure relates to the field of wireless communication and sensing. In particular, the disclosure provides apparatuses and methods for wireless communication and sensing systems.

Technical Considerations

Wireless communication has been advancing over several decades now. Exemplary notable standards organizations comprise the 3rd Generation Partnership Project (3GPP) and IEEE 802.11, commonly referred to as Wi-Fi. In practice, devices supporting such standards or devices with proprietary communication and sensing applications may at least partly share spectrum.

Cognitive radio is one of the emerging technologies for exploiting the system spectrum. Cognitive radio devices are supposed to dynamically use the best wireless channels in their vicinity to improve spectrum efficiency. In order to achieve this, spectrum occupancy information may be desirable to help modeling and predicting the spectrum availability for efficient dynamic spectrum access. Spectrum occupancy prediction may be based on using the information on previous spectrum occupancy to predict future occupancy. Such a prediction is based on exploiting the inherent correlation between past and future occupancies. Some approaches exploit time-domain correlation and thus cast spectrum prediction as a time-series prediction. Some approaches additionally consider exploiting the correlation along the frequency axis, and thus exploit time-frequency correlation. Correlation may also exist in the spatial domain. Thus, exploiting the correlation in all mentioned domains may be desirable.

Some particular studies use conventional statistical methods such as an autoregressive model-based method or Bayesian inference-based methods for spectrum prediction. There are some approaches employing machine learning (ML) methods such as wavelet neural networks and shallow artificial neural networks. Some more recent works mention deep learning (DL)-based approaches to further improve the performance. DL-based methods can use correlation in multiple domains.

SUMMARY

Methods and techniques, as well as the corresponding devices are described, facilitating cognitive radio applications and other approaches to improve wireless spectrum usage. In particular, in the present disclosure, it is recognized that identification of the sensing applications may be employed to further improve one or more aspects of wireless spectrum usage in particular when the spectrum is shared by possibly different communication and/or sensing devices.

In some exemplary implementations, a method is provided for identifying a sensing application comprising the steps of: obtaining a received wireless signal, estimating, by a trained module, presence of a sensing signal in the received signal, the sensing signal being a signal generated by a sensing application, performing wireless reception, transmission or sensing based on the estimated presence of said sensing application.

Other exemplary implementations concern a training method, a training apparatus and an apparatus for identifying a sensing application, as well as a program and a computer readable medium storing a program for executing the methods.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the disclosed subject matter. As used in the specification and the claims, the singular form of "a," "an," and "the" comprise plural referents unless the context clearly dictates otherwise.

BRIEF DESCRIPTION OF THE DRAWINGS

An understanding of the nature and advantages of various embodiments may be realized by reference to the following figures.

DESCRIPTION

Figure 2:
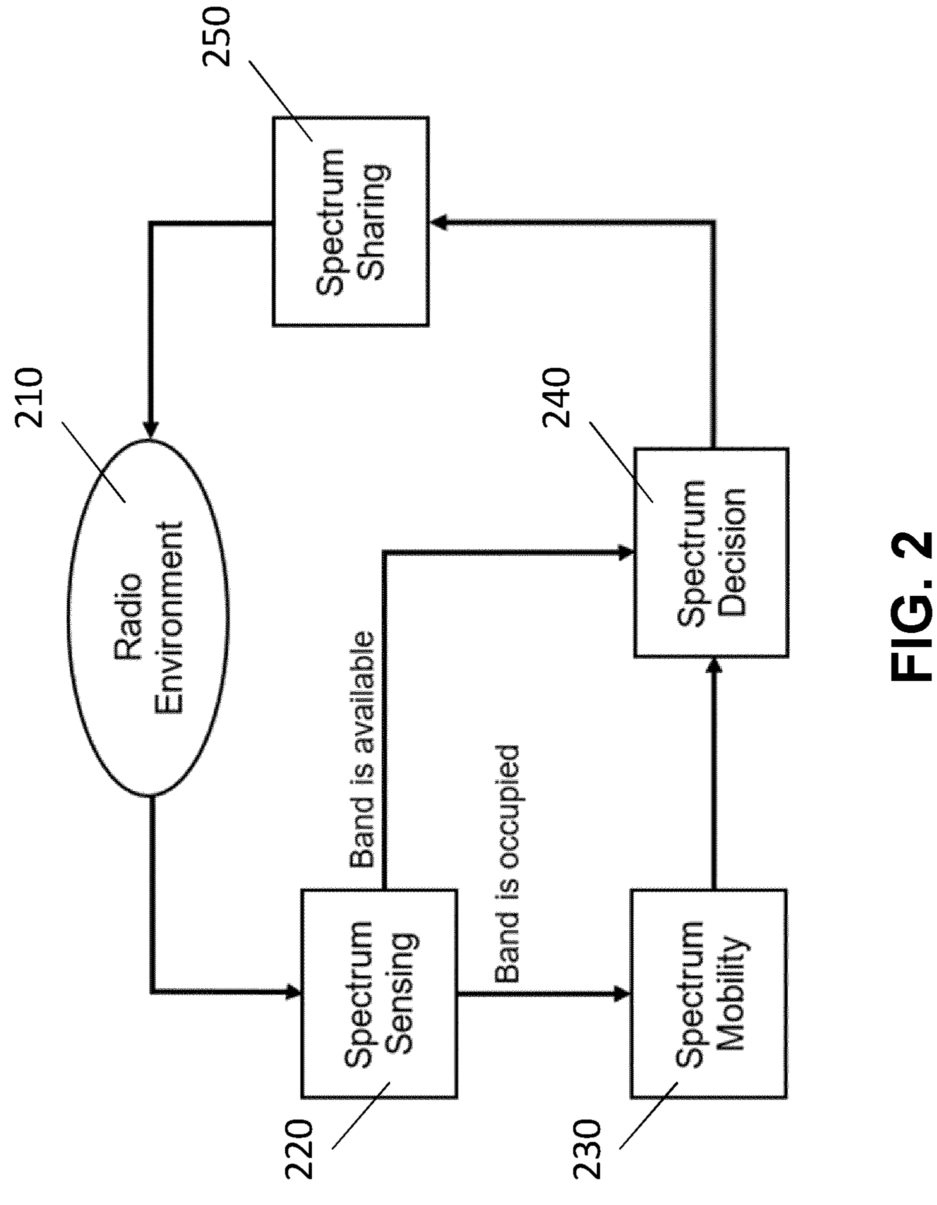
FIG. 2 is a flow diagram illustrating an exemplary spectrum management method.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to comprise one or more items and may be used interchangeably with "one or more" and "at least one." Furthermore, as used herein, the term "set" is intended to comprise one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Although the aforementioned techniques may be successful in some cases, they do not provide full information or awareness about the future spectrum or its usage. Meanwhile, wireless sensing is gaining popularity in commercial devices, for environment monitoring, health monitoring, and numerous other applications. Military use of wireless sensing such as radar has always been popular. The existence or non-existence of a signal or knowledge of its features is generally not sufficient to identify or predict the behavior application, and therefore, this information is not very useful for sensing applications. In particular, sensing applications generate signals, which may typically have a pattern different from those of some communication applications. For instance, most wireless sensing applications generate periodic signal transmissions of varying periodicity. Effectively scheduling and managing these transmissions would result in less spectrum and power wastage. Therefore, if a device can determine which sensing application is utilizing the spectrum, it can either plan its own transmissions such that they fall in the empty slots or utilize these transmissions for its own sensing, if they are suitable. Further exemplary utilization of the information is possible, e.g. the spectrum prediction may be provided to further devices in the area whether the spectrum is shared to enable them efficient resource access. In summary, it would be desirable to provide an approach for sensing application identification and prediction, in order to improve resource access and utilization possibly even without a single central resource managing entity. In this way, some of multiple coexisting sensing and communication devices may operate in a more effective manner.

Figure 1:
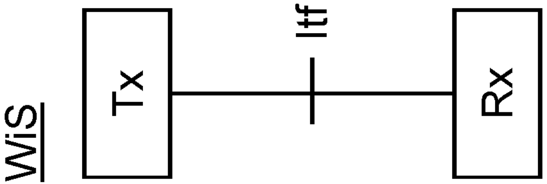
FIG. 1 is a block diagram illustrating a basic communication system.

FIG. 1 illustrates an exemplary wireless system WiS in which Tx represents a transmitter and Rx represents a receiver of the wireless signal. The transmitter Tx is capable of transmitting a signal to the receiver Rx or to a group of receivers or to broadcast a signal over an interface Itf. The interface may be any wireless interface. The interface may be specified by means of resources, which can be used for the transmission and reception by the transmitter Tx and the receiver Rx. Such resources may be defined in one or more (or all) of the time domain, frequency domain, code domain, and space domain. It is noted that in general, the "transmitter" and "receiver" may be also both integrated into the same device. In other words, the devices Tx and Rx in FIG. 1 may respectively also comprise the functionality of the Rx and Tx.

The present disclosure is not limited to any particular transmitter Tx, receiver Rx and/or interface Itf implementation. However, it may be applied readily to some existing communication systems as well as to the extensions of such systems, or to new communication systems. Exemplary existing communication systems may be, for instance the 5G New Radio (NR) in its current or future releases, and/or the IEEE 802.11 based systems such as the recently studied IEEE 802.11be or the like. The wireless signal is not necessarily a communication signal in the sense that it does not necessarily carry out human or machine communication. It may be, in particular, a sensing signal such as a radar signal or sounding a signal or any other kind of wireless signal from a sensing device such as some signal reporting sensing results to another device(s).

For instance, the amendment IEEE 802.11bf-Wireless Local Area Network (WLAN) Sensing—may comprise support for wireless sensing in WLAN networks. Some embodiments may be used to enhance the performance of devices complying with this standard, e.g., to reduce the amount of redundant sensing signals in an area or a network. The fifth-generation (5G) New Radio (NR) standard or 6G standards may also apply wireless sensing as its part of future cellular communications networks. Some embodiments of the present disclosure may help to predict the empty spaces in the licensed-exempt spectrum during opportunistic spectrum usage, where most wireless sensing is expected to take place. The present disclosure is also applicable to communication technologies under long-term evolution (LTE)/LTE Unlicensed (LTE-U).

As mentioned above, spectrum awareness is an important part of cognitive radio (CR). Some embodiments of the present disclosure may facilitate the identification and prediction of sensing transmissions. The IEEE 802.22 and IEEE 802.15 standard support CR and may thus profit from the present disclosure. The present disclosure is also applicable to low-power wide-area network (LPWAN) technologies, as it aids in increasing power efficiency through reducing the number of redundant sensing transmissions. Thus, it is related to LPWAN standards such as Wize, ZigBee, NarrowBand IoT, and LoRaWAN. In general, some embodiments can be used in high frequencies—or millimeter waves (mm-waves)—as the spectrum availability and propagation characteristics are suitable for high-resolution wireless sensing. It can be used for managing resources for wireless sensing.

The devices Tx and Rx in FIG. 2 may respectively also comprise the functionality of the Rx and Tx. The transmitter Tx and receiver Rx may be implemented in any device such as a base station (eNB, AP) or terminal (UE, STA), or in any other entity of the wireless system WiS. A device such as a base station, access point, or terminal may implement both Rx and Tx. The present disclosure is not limited to any particular transmitter Tx, receiver Rx and/or interface 200 implementation. However, it may be applied readily to some existing communication systems as well as to the extensions of such systems, or to new communication systems. Exemplary existing communication systems may be, for instance, the 5G New Radio (NR) in its current or future releases, and/or the IEEE 802.11 based systems such as the recently studied IEEE 802.11be or the like. Sensing applications signals may also be embedded within resources provided by one or more or the known systems such as some IEEE 802.11 standards or their possible specific extensions for supporting sensing applications.

One of the applications of the sensing application identification is spectrum occupancy. In general, spectrum occupancy may be based on using previous occupancies, arranged in time-frequency grids, along with spatial correlations of such occupancies to predict future spectrum occupancy states. This may be achieved, for example, by training some trainable models to predict occupancy probability for time-frequency occupancy grids. It is noted that the machine learning or deep learning and classifier models may be trained over real-world data obtained through measurements, and then they are readily usable for spectrum prediction. Deep learning refers to trainable models with more than one layer. Machine learning refers to trainable models with any structure comprising the layer structure applying one or more layers. The models may be embedded in functional and/or physical modules. Accordingly, when referring herein to a trainable module, what is meant is a functional module, which implements a trainable model such as machine learning or deep learning or other kinds of models. Such models, when employed, are typically pre-trained (in a training phase) and not changed (updated) in operation. However, the present disclosure is not limited to any particular spectrum occupancy prediction. It may be also performed without employing trained modules, by using statistical models or other models.

One of the non-limiting applications of the spectrum occupancy prediction is for radio resource management and/or spectrum allocation purposes in some wireless networks such as mobile communications networks (e.g. 4G, 5G, 6G, or the like) or wireless local area networks (WLAN). In general, the spectrum occupancy prediction may be utilized in cognitive radio systems. FIG. 2 shows an example use of spectrum sensing in cognitive radio. Radio environment 210 may be formed by a plurality of BSs and UEs and/or other entities, e.g. as shown in FIG. 1. One or more of the entities may then perform spectrum sensing 220. Spectrum sensing is a procedure in which before any device transmits a signal, it listens (detects) whether or not another device is already transmitting. Such an approach may be particularly useful in spectrum parts, which may be used by different systems such as unlicensed spectrum parts, which may be used by WLANs as well as by cellular systems or other systems. If the band for transmission is detected in step 220 as available, it may be decided to use the spectrum for the transmission in step 240. If the spectrum is not available in step 220, then a different spectrum may be selected for utilization in step 230. Thereby, the spectrum may be shared 250 in an efficient manner and the spectrum utilization information may be further considered by the radio environment 210. Here, the spectrum occupancy prediction may be performed by the radio environment in order to select the spectrum to be sensed based on the result of the prediction. The spectrum occupancy prediction may employ neural network(s) such as CNN, or LSTM (in general recurrent networks), or the like.

Future wireless devices are expected to be sensing capable, or at times, solely wireless sensors, to support communication applications and/or provide a wide range of other applications, such as fully immersive extended reality, improving quality of life by enabling smart environments, improving health-related applications through non-invasive tests and vital signs monitoring, and much more. Wireless sensing applications may require periodic or continuous sensing transmissions. However, allowing all sensing/sensing capable devices to transmit their own sensing transmissions may reduce spectral efficiency and degrade the performance of networks operating in the license-exempt bands. Additionally, because sensing transmissions are periodic, there is a strong likelihood that they will cause interference to communication transmissions if they are scheduled opportunistically, or if they have opportunistic channel access mechanisms. This problem can be solved by comprising sensing-aware channel access and sensing coordination protocols in the standards. However, these would only enable communication and coordination for sensing and devices within the same network. At the same time, this would increase control signalization overhead and complexity. Wireless communication trends are heading towards decentralized and minimum-coordination networks, with the coexistence of a larger number of wireless networks in the same area. As such, methods to identify and predict, or the act of identifying and predicting, future sensing transmissions before transmitting are required in the standards. This would allow devices to better allocate their resources and schedule their transmissions.

Wireless sensing is a process of obtaining information or awareness of the environment through measurements on received (e.g., reflected or directly received) electromagnetic signals. In this definition, processes such as spectrum/channel sensing, radar, joint radar and communication, WLAN sensing, and other methods can be considered as wireless sensing methods. Most wireless sensing methods have either periodic or continuous transmission patterns. An example could be a radar, where a continuous signal or periodic pulses are transmitted. Another example could be channel state information (CSI) based WLAN sensing, where packets are transmitted with some periodicity. The sensing transmissions may have a specific frame design or transmission mechanism, which is specific for some sensing application(s) and may vary based on the sensing application requirements and environment conditions. Periodicity is an important condition for sensing applications, as disruptions in the periodicity of transmitted/received signals due to interference from other devices, the inability to schedule transmissions, or access the channel using channel access protocols may cause a disruption of measurements. This may cause false alarms, missed detections, reduced resolution of sensed information, overall performance degradation of the sensing application. Depending on the application, this could have severe monetary consequences or life risks.

Signal identification allows devices to identify some features of a signal, such as wireless technology (LTE, 5G, etc.), waveform, modulation type, etc., based on some characteristics of the signals, such as bandwidth, spectrogram image, etc. There are some applications in which certain characteristics are identified for the purpose of synchronization or authentication. Also, spectrum sensing is known, which is used to identify primary users' spectrum occupancy status. However, it may require continuous spectrum sensing. Alternatively, spectrum prediction techniques can be used to save time, energy, and computation overheads required by spectrum sensing.

Although the successes of the aforementioned techniques in numerous applications, they do not provide full information about future and current sensing applications. These applications within a network can be predicted using upper layer information. However, the problem arises when the spectrum is shared between different networks or devices. This is because the access point (AP)/base station (BS)/other devices will not be aware of these transmissions and the transmissions may not be suitable for the sensing method of the AP/BS/other device or will cause interference. In this situation, spectrum occupancy prediction techniques can be used to predict the spectrum occupancy.

In future wireless communications, there may be several wireless sensing applications. Generally, sensing applications use continuous signals (with some periodicity), which may degrade the spectral efficiency drastically. This is especially the case where numerous sensing applications/devices are used at the same time and/or in the same area. Some embodiments and exemplary implementations provide methods and apparatuses for the identification and prediction of the sensing applications, which depend on some features of the received signals. If the sensing application is known, other devices can schedule their transmissions accordingly without interfering with the other applications or utilize the present sensing transmissions for their own sensing applications. Thereby, the spectrum, power, and other resources can be used efficiently.

These are two aspects in the present disclosure: sensing application identification and sensing application prediction. In the sensing application identification, the first step is identifying whether the signal is a communication or sensing signal. To identify it, periodicity and frame structure, along with other features, can be used. These are detailed below.

Detecting Type of Application: Periodicity

Figures 3, 4:
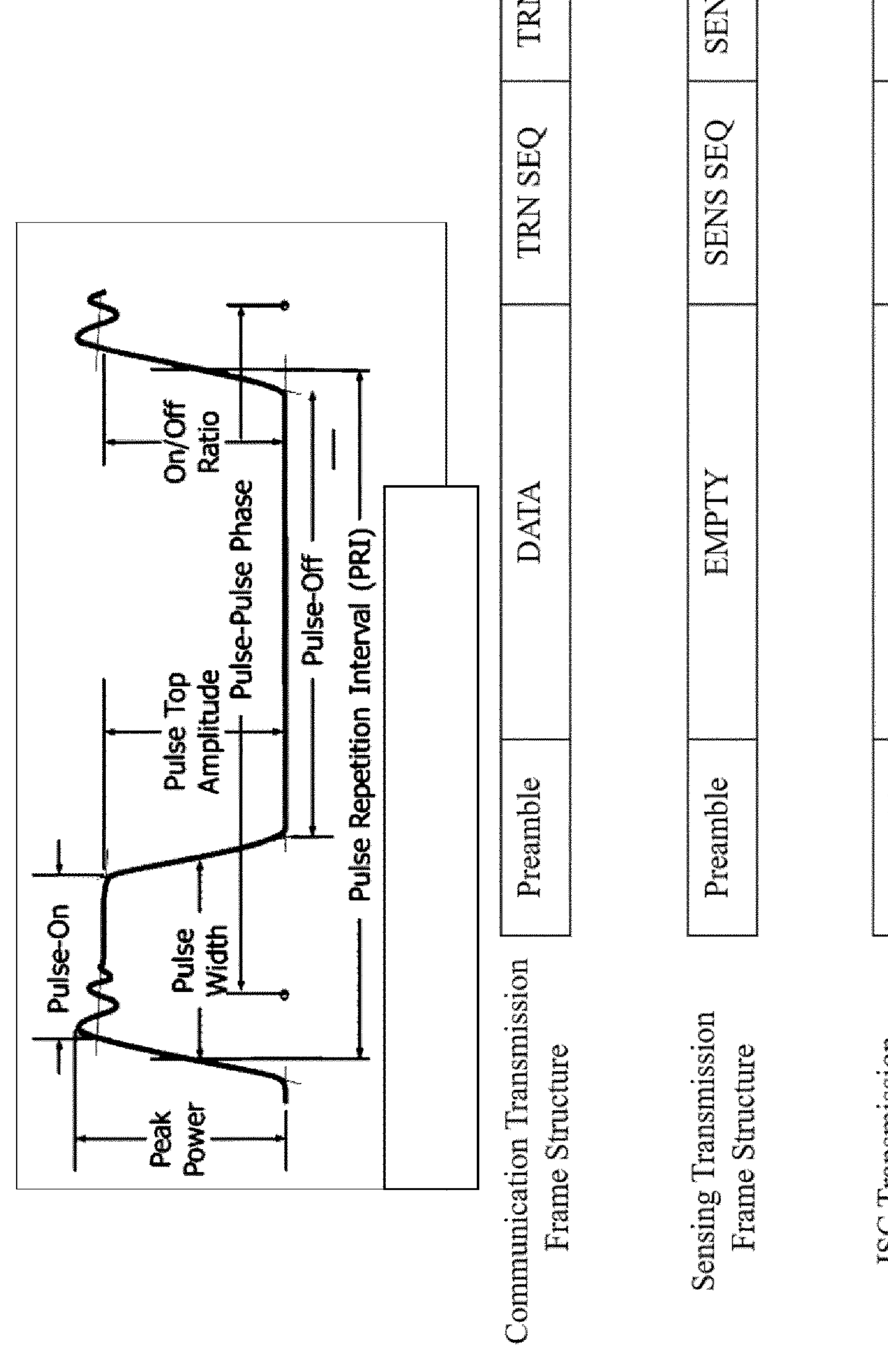
FIG. 3 is a schematic drawing illustrating an exemplary pulse radar signal.
FIG. 4 is a schematic drawing illustrating various frame format depending on whether the application generating the frame is sensing, communication of JSC.

Sensing signals may be sent with a certain rate or periodicity. Depending on the features to be detected and resolution or accuracy, signals can be sent at different rates. Communication signals, on the other hand, are typically more random and do not have any significant periodicity (they may be periodic for 2-3 packets due to the nature of scheduling, but will not be periodic in the long term). An exemplary sensing signal is illustrated in FIG. 3.

There are various radar waveforms that can be used. The most popular are the pulse radar and frequency modulated continuous wave (FMCW) chirp radar. In pulse radar, the signal is "on" (or being transmitted) during some time of the total frame time, and "off" (not transmitted) the rest of the time as shown in FIG. 3. The duration of the signal is "on" or "off" (duty cycle) gives a trade-off between range and range resolution. Longer "on" periods (wider pulse width) provides better range, but poor resolution and vice versa. FMCW chirps are continuous (no off time) and are also able to detect relative velocity (pulsed radars cannot do this without some modifications).

For the purpose of deciding whether or not the signal is a sensing application signal or a communication application signal, it may be sufficient to identify, for instance, whether or not the signal is continuous and has a certain waveform or whether or not the signal is a periodic signal, without determining the period of the signal. However, it is noted that the present disclosure is not limited thereto and the period may be also identified, which may contribute to the reliability of the determination and which may be used to also further identify the sensing application.

Detecting Type of Application: Frame Structure

Depending on the sensing application requirements, different frame structures can be used for wireless sensing. The sensing transmissions may have a known frame structure in some wireless communication standards. This frame structure may be similar to a data transmission frame structure, maybe with the exception of having more suitable pilots or training sequences, which may be used for sensing, and may support data transmissions as well, as shown in the second and third frame structures in FIG. 4.

In particular, FIG. 4 shows in the first row an exemplary communication transmission frame structure, comprising a preamble portion, a DATA portion (in which payload or higher layer signaling may be transmitted), and two training sequence (TRN SEQ) portions which may be used for channel estimation and/or synchronization or the like. In the second row, an exemplary sensing transmission frame structure is shown. As can be seen, no data are transmitted in this frame structure. Instead of training sequences TRN SEQ, sensing sequences SENS SEQ are provided. In the third line, a joint sensing and communication (JSC) transmission frame structure is employed, which is similar to the sensing frames structure, but which comprises also the DATA portion as shown in the communication frame structure. However, it is noted that these three exemplary frame structures are merely simplified examples, and real frame structure may comprise more portions (fields) carrying various preamble portions, training portions, sensing portions, data portions, and possibly also signaling portions or other portions (such as padding portions).

Moreover, devices which don't comply with wireless communication standards may use various frame designs, which may be distinct from frame designs of data transmissions.

Detecting Type of Application: Further Features

Besides the periodicity and the frame structure, any kind of features which are different for communication and sensing signals can be used to identify them or to contribute to identification alongside to periodicity and frame structure. For example, a waveform may be also characteristic for various different standards and may also differ for sensing and communication systems in some cases. In summary, as a first step, according to some embodiments, it may be determined whether (or not) a signal is a signal generated by a sensing application or a signal generated by a communication application. In some exemplary implementations, the detection may also distinguish between communication, JSC and sensing applications. Such distinction may help identifying pattern of resource usage and identifying the source application or standard or device.

If the signal is a sensing signal, the second step (after identifying whether the signal is a signal generated by a communication application or a sensing application) may be to use its features—periodicity, bandwidth, sensing duration, and/or others—to identify the sensing application the signal belongs to. Some of these features are detailed below.

Identify Application: Periodicity

Different sensing applications may have different predefined or pre-determined periodicities. As mentioned above, the periodicity may comprise time interval when the signal is transmitted (ON) and the time interval when the signal is not transmitted (OFF).

The periodicity corresponds to the transmission rate of the sensing transmission and corresponds to the time resolution of the measurements (sensing task). Generally, applications to detect fast changing actions/motions/objects require a higher periodicity or packet rate and vice versa. A lower packet (wavepacket, pulse) rate in radar can be a factor, which increases the maximum range. This may be because, between the packets, the radar listens for reflections. The higher the packet rate, the less time the receiver may have has to listen for reflections in some implementations. Any occurring reflections may be impacted by interference, because of the transmitted signals. Reflections from objects further away may take a longer time to get to the receiver. If at that point another chirp or radar signal is transmitted, it may be difficult to decide whether there is a reflected signal and which transmitted signal the reflected signal belongs to. Moreover, maximum range may be tied to the transmission power.

For example, for Wi-Fi sensing applications using CSI or received signal strength (RSS) or received signal strength indicator (RSSI), 100 packets per seconds (pkts/s) may be used for gesture recognition and 5-20 pkts/s may be used for sleep monitoring (position and breath rate).

For instance, for gesture recognition, from these measurements, patterns for certain kinds of motions can be extracted and used to detect the same motions in new measurements. Alternatively, a learning algorithm can be applied to cluster or classify the measurements to certain groups/actions. The packet rate here may determine the measurement resolution. If the action to be detected is a fast changing one, then higher resolution may be required.

In summary, sensing application identification may be performed based on the signal periodicity alone or in combination with further features.

Identify Application: Bandwidth

High bandwidth may be needed for better range resolution and fine-grained CSI information, which may be required by specific sensing applications. For example, applications like high resolution wireless imaging or detecting minute objects and motions require a larger bandwidth. For some wireless sensing processes, the bandwidth may also affect the number and placement of the training/sensing sequence subcarriers. In some applications, different subcarrier frequencies are affected differently by different motions/actions. Therefore, a larger bandwidth can allow more information to be gathered. Conversely, if the sensing method relies on another measurement, like RSS/RSSI, the device may take a measurement at the carrier frequency only and the bandwidth may not have much importance. Intuitively, these sensing applications would use transmissions with smaller bandwidths, e.g. to save power and maybe implementation costs. Thus, the bandwidth occupied by a sensing application may distinguish between sensing applications directed to different object sizes as well as between applications, which do not sense objects at all, or the like.

Identify Application: Sensing Duration and Start/End Times

It may be unreasonable for Wi-Fi devices to continuously sense the environment if the application does not require it or has ended. For example, a fully immersive video game may only last a couple of hours at a certain time of the day. However, home/room monitoring applications will last 24/7 or until the application is turned off by the user. Similarly, sleep monitoring applications will only last during the night time. Vital signs monitoring during exercise would only last a few hours and will most likely be scheduled. Therefore, the sensing signal transmission duration and start/end times can also indicate the sensing application.

Sensing Application Identification: Further Examples

In summary, the sensing application may be identified based on one or more or all of the above-mentioned features. Further features such as waveform, day time, day of the week or day of the year may be used. When referring to identifying the sensing application, what is meant may be, for example, distinguishing between a radar signal and between medical/health care measurement reporting and or between other sensing applications.

For the purpose of an example, the environment for sensing application identification may be local networks or area networks, which may be home networks or networks covering a neighborhood street with a few buildings. However, the present disclosure is not limited to any particular scale. For example, the street is active and has autonomous vehicles regularly passing by. The autonomous vehicles are performing radar sensing with FMCW signals. Additionally, road-side units for intelligent transport systems are also sensing the roads for vehicular and pedestrian traffic. The buildings may be private residences and offices, public/governmental buildings, schools, hotels, etc. The buildings contain relevant wireless environment sensors, such as home/office monitoring sensors, gesture recognition sensors, sleep monitoring sensors, etc., as well as numerous WLAN devices performing sensing for various applications, communication or otherwise.

In the following, it is elaborated on an example of a private residence with some home monitoring, gesture recognition, and sleep monitoring sensors. There are also numerous communicating devices in all frequency bands. To summarize, the sensing elements and example parameters for the initial scenario may be as listed below:

(Mobile) Autonomous Vehicles:
- Single transceiver
- FMCW radar waveform
- Frequency=6 GHZ
- Bandwidth (BW)=40 MHZ
- Periodicity=100 pkts/s (Stationary) Roadside Unit:
- Single transceiver
- FMCW radar waveform
- Frequency=60 GHz
- BW=1 GHZ
- Periodicity=100 pkts/s Home Monitoring:
- 2 APs and 5 sensing/responding nodes
- Wi-Fi Physical-layer Protocol Data Unit (PPDU) frame format
- Frequency=2.4 GHZ
- BW=20 MHz
- Periodicity=100 pkts/s Sleep Monitoring
- 1 transmitter and 1 receiver
- Wi-Fi PPDU
- Frequency=60 GHz
- BW=20 MHz
- Periodicity=10 pkts/s Gesture Recognition
- 1 APs and 5 sensing/responding nodes
- FMCW radar waveform
- Frequency=60 GHz
- BW=120 MHZ
- Periodicity=100 pkts/s As can be seen in the above-mentioned examples, there are one or more features, which enable distinction between the applications. It is noted that the above example is fictional, and that the measurement values may vary, which may make it easier or more difficult to make the distinction correctly. It is noted that these five features (number of transmitters and/or receivers, frame structure/waveform, carrier frequency, bandwidth, and periodicity) are only exemplary here. In general, depending on the desired resolution for the sensing application identification, one or more of these five features and/or any other feature capable of distinguishing (or contributing to the distinction) between sensing applications may be used. In exemplary and non-limiting implementations, the features may be detectable as mentioned above. With regard to the number of transmitters and/or receivers, they may be detected by RF fingerprinting or other identification techniques used in PHY authentication to identify the transmitting devices or AP/STA.

The transmission parameters such as those mentioned above may be used for null data packet (NDP) sounding and may thus correspond to sensing operational parameters. Since a measurement of a channel is typically made by the NDP, negotiating the transmission parameters of the NDP may be important in order to meet the performance requirements of the sensing applications.

In an environment, multiple sensing sessions belonging to unique sensing applications can take place simultaneously. There may be various configurations resulting from presence of several devices with overlapping signal coverage. Some exemplary configuration options are:

a) Stand-alone devices, such as autonomous vehicles, that sense environment primarily by their own sensors, b) AP—non-AP STA, non-AP STA—non-AP STA (point-to-point, P2P) sensing and/or joint sensing and communication, and/or c) AP—multiple non-AP STA, non-AP STA—multiple non-AP STA (point-to-multipoint, P2M) sensing and/or joint sensing and communication.

As already mentioned above, some exemplary types of sensing (based on measurements) may comprise:

Radar-based sensing as mentioned above (it may be based on delay measurement or delay as well as Doppler shift measurement), CSI-based sensing, RSSI-based sensing, and/or SNR-based sensing (e.g. sensing beam SNR).

For a trigger-based sensing, sensing operational parameters may be negotiated during a sensing session setup. This may provide the advantage that the parameters are only transmitted once during a session. On the other hand, they cannot be adapted to changing requirements during a session. In order to do so, the session would need to be terminated and re-negotiated.

Another option is a negotiation of the sensing operational parameters during measurement setup. With such negotiation, the sensing operational parameters can be transmitted as frequently as necessary. On the other hand, a responding STA (RSTA) may not be able to support these parameters.

In an advantageous implementation of a sensing device such as STA or AP, the negotiating of the operational parameters is performed compulsory in the sensing session setup and optionally in the measurement setup. If the operational parameters are not (re)defined in the measurement setup, they are assumed to remain unchanged in comparison with the operational parameters negotiated at the sensing session setup. Accordingly, an exemplary STA or AP is configured to negotiate the sensing operational parameters at a session start and it may be further configured to negotiate operational parameters within the measurement setup. For instance, there may be a condition e.g. based on channel state, according to which the sensing device determines whether or not to (re)negotiate the initially negotiated sensing operational parameters.

Among the above discussed operations parameters, the parameters that are likely to affect the quality and rate (possibly also computational complexity) of the sensing to a higher degree are:

Requested sensing rate (specifying how frequently the sensing is performed, which may be given, e.g. by the minimum number of frames per second to be transmitted by the transmitting device).

Bandwidth or channel width (e.g. specifying the uninterrupted (continuous in frequency domain) bandwidth of transmission)

Beamwidth (e.g. the relative beamwidth (given, for instance by levels such as three levels coarse, mid, fine for above-60 G Hz band).

Transmit output power (e.g. specifying the accepted minimum and maximum transmit output power of the transmission).

In the following, these sensing operational parameters and their impact are discussed in more detail.

The requested sensing rate may be represented by the frequency of the NDPs and of the corresponding measurements determines the time-domain resolution of the measurements. Different sensing applications can have different requirements for the time resolution. For example, a gesture recognition needs more frequent measurements (e.g. 100 frames/second) than the sleep monitoring (performing still well with 5 frames/second) as mentioned above. If there are too few NDPs and the corresponding measurements, the measurements may become old (outdated) which may be caused by the channel conditions changing within the NDP repetition period. On the other hand, if there are too many NDPs and the corresponding measurements, the network traffic may increase unnecessarily. Measurements that exceed a certain number of measurements per time may not further contribute to a significant increase in the sensing performance. It is noted that transmitting NDPs with a strict (fixed) rate may not be suitable due to equipment shortcomings, no free channels at that time, and/or posible collisions or further factors. For similar reasons, the time interval between consecutive transmissions may not be always accurately implementable. Accordingly, a meaningful operational parameter specifying the requested sensing rate may be the minimum number of frames per second to be transmitted by the transmitting device. Alternatively or in addition, an average number of frames per second may be specified.

Bandwidth affects range resolution in radar sensing. The wider the bandwidth, the finer the resolution. For autonomous vehicles and V2V scenarios, radar using 802.11p PPDU has been studied and found that the 10 MHz bandwidth allowed is not sufficient for the typically desired range resolution (and thus target separability) while around 100 MHz may be sufficient. Therefore, if bandwidth is negotiable, IEEE 802.11bf amendment can be used in such applications. Bandwidth also increases the number of measurements per frame for CSI-based sensing, therefore capturing more information, even if a compressed CSI metric is reported.

Determining or standardizing a quantitative value for the beamwidth may be hardware dependent to high extend. Therefore, it is advantageous to determine relative or qualitative terms, which reflect the capabilities of the transmitting device. For example, as mentioned above, the beamwidth of the transmission in a bandwidth above-60 GHz is the beamwidth of the NDP relative to the device capabilities. Such relative values may be, for instance: coarse, mid, and fine beam. However, the present disclosure is not limited thereto and, in general, there may be only two levels (e.g. broad and narrow) or more than three values. It is also noted that in general, the embodiments of the present disclosure may also be implemented by referring to directly to a bemawidth and not to the above mentioned relative values.

In radar-based sensing, the transmission power is directly related to the range or distance that can be measured. There can be some applications, which are only interested in objects within a certain radius of the transmitter. Having transmit output power as an operational parameter would prevent unnecessary reflections and computation to remove these reflections, conserve power, reduce interference, improve spectral reuse, etc. Similarly as in case of the bandwidth, the NDP may contain the Tx power in its signalization. However, the transmission power may still need to be negotiated if the sensing transmitter is not the same as the sensing receiver. Determining a fixed value for the transmit output power may not always be possible due to other restrictions defined by the standard or interference mitigation techniques. In order to provide an operational parameter, the transmission power may be negotiated (and thus defined) as a requested minimum and maximum transmit output powers of the signal to achieve the sensing performance.

In general, according to an embodiment of the present disclosure (which may be combined with the above mentioned embodiments relating to co-existing wireless sensing and joint sensing and communication applications; negotiating operational parameters is performed in the sensing session setup. In addition, the negotiating of the operational parameters may be performed in the measurement setup. For example, the NDP transmitting and/or receiving device may initiate the negotiation in the measurement setup based on some event, such as measurement of highly changing channel conditions or the like. Whether or not such event occurs may be determined based on a condition, such as exceeding a certain threshold on channel state change or received power or the like.

If the operational parameters are not defined in the measurement setup, they are assumed unchanged.

One or more (or all) of the following parameters are advantageously shall be negotiated in the sensing session setup phase and can be optionally negotiated in the measurement setup phase:

Requested sensing rate

Bandwidth or channel width

Beamwidth

Transmit output power

It is noted that the present disclosure does not exclude adding further parameters. For example, the number of transmitting and receiving antennas may provide further information about the available hardware in addition to the beamwidth.

According to a particular exemplary implementation, the requested sensing rate is the minimum number of sensing frames per second to be transmitted by the transmitting device. The bandwidth is the contiguous bandwidth of a sensing transmission. Beamwidth of the transmission in above-60 GHz bandwidth is the beamwidth of the NDP relative to the device capabilities. There may be three possible width indicating values that can be distinguished (negotiated). Transmit output power may be the requested minimum and maximum transmit output powers of the signal to achieve the sensing performance.

In the following tables, known exemplary use cases are shown which illustrate how different values may affect the performance of sensing or communication.

In particular, Table 1 relates to requested sensing rate. The percentage of sensing transmissions to the other transmissions is given for some applications there. For example, for presence detection, the sensing transmissions result in up to 2% network load. This is related to the periodicity and thus to the requested sensing rate.

TABLE 1

| Network Load (%) | Applications |
|---|---|
| ≤2 | Presence detection, human counting, localization, motion detection, proximity detection |
| ≤5 | Detection of humans in car, gesture recognition (finger + hand), human counting, localization, speed detection |
| ≤10 | Intruder detection, gesture detection (body), aliveness detection, face/body recognition, fall detection, sneeze detection, driver sleepiness detection, heart rate, breathing rate measurements, person localization and tracking, |

Table 2 below relates to contiguous bandwidth or channel width. In particular, bandwidth B has the following impact on range resolution (to which the separability is related) $\Delta R$, $\Delta R=c/(2B)$, and on maximum velocity, $v\_max=\lambda B/2$, with $\lambda$ being the signal wavelength.

TABLE 2

| Range Separability (m) | Applications |
|---|---|
| ≤0.1 | 3D vision |
| ≤0.5 | Presence detection, human counting, human tracking, breathing rate, heart rate detection, sneeze sensing, fall detection, detection of human in car, |
| ≤1 | Person tracking, motion/gesture detection, |
| ≤2 | Proximity detection |

Moreover, Table 3 illustrates an impact of the beamwidth on angular separability (resolution) and thus on various applications. For 60 GHz bandwidth (and higher) the angular resolution $\Delta\theta$ is given by:

$$\Delta\theta = 2R\sin\frac{\theta}{2},$$

wherein $\theta$ is the beamwidth and R the slant range.

TABLE 3

| Angular Separability (°) | Applications |
|---|---|
| ≤3 | 3D vision |
| 3-4 | Presence detection, human counting, localization, detection of humans in car |
| 5-6 | Sneeze detection |

Table 4 illustrates a maximum range that is necessary for certain applications. The maximum range is proportional to the transmission power.

| Maximum Range/ Distance (m) | Applications |
|---|---|
| ≤1 | Gesture recognition (finger movement), aliveness detection, face/body recognition, proximity detection, |
| ≤5 | Gesture recognition (hand movement), human detection in car, driver sleepiness detection, breathing rate, heart rate measurement |
| ≤10 | Presence detection (home security), human counting (meeting room), human localization, motion detection, human tracking, gesture recognition (full body movement), fall detection, sneeze detection, 3D vision |
| >10 | Presence detection (number of persons in room, store sensing), human counting (store sensing) |

As can be seen from the above exemplary sensing application requirements (or more generally characteristics), they can distinguish a wide variety of different sensing applications. Accordingly, the bandwidth, sensing rate (periodicity), beamwidth, and/or transmission power may be used as characteristics input to the sensing application identification as described in any of the embodiments and exemplary implementations of the present disclosure.

In the following, an example is provided in which the sensing application identification is used for the purpose of own sensing. For example, the sensing and communicating devices are initially transmitting their signals (for the sake of simplicity, with no interference to each other—in presence of interference—which is the normal case, the results may be impacted in accuracy of identification). The roadside-unit is a critical sensing application and therefore is continuously transmitting signals. The gesture recognition application is both not critical and is an on-demand application. Once the gesture recognition application is initiated, the sensing device will first take snapshots of the spectrum at its required frequency band (60 GHZ) and analyze them. It will find that there are two periodic transmissions—from the sleep monitoring device and the roadside unit. The other signals will be discarded and the gesture recognition device will further analyze these signals and compare their parameters to its own required transmission parameters. From the two transmissions, the transmissions of the roadside-unit are more suitable for gesture recognition application, as it applies a similar waveform (FMCW radar type), frequency and the like. Therefore, rather than transmitting its own signals, the gesture recognition application may utilize the signals of the roadside unit. This is a possibility because some properties (waveform, frequency, periodicity) of both applications are similar. Only their bandwidth requirements may be different. For example, the bandwidth of the roadside unit may typically be higher than the gesture recognition. Therefore, bandwidth of the roadside unit signal would be sufficient for gesture recognition. As a result, the spectrum may be used more efficiently. Alternatively, without comparing its own required and available signal parameters, the gesture recognition application (module) can enter a training phase, where it utilizes all of the sensing transmissions that it is able to process (with regard to hardware suitability) and choose the one which results in the least error or best meets the performance metrics of the sensing application.

Now, in this example, to enable smooth continuity of the sensing application, the gesture identification device may need to ensure that the sensing transmissions will continue. This can be done by identifying the sensing application. From a dictionary of sensing signal parameters and applications, or by learning techniques, the gesture recognition device can know or determine that the sensing signals it is using belongs to a critical sensing application and therefore, the sensing transmissions will continue. When referring to the dictionary of sensing signal parameters and applications, what is meant is a pre-stored list, in which the application identification and the values of features such as frequency, bandwidth, waveform, etc., as mentioned above are captured. The sensing application identification may be performed by means of a statistic algorithm. Alternatively, a machine learning or deep learning algorithm may be used to receive a signal as an input and classify the signal originating sensing application as one out of a set of predefined sensing applications. Hybrid approaches are conceivable in which the values of features rather than signal directly are fed into a trained (trainable) module to output the sensing application identification (to classify the sensing application which originated the signal).

Also, similar embodiments and exemplary implementations may be used for signal intelligence. In other words, enemies' applications can be identified and some cautions can be taken before they happen. For example, if the detection learns that enemies want to sense their own soldiers' or generally persons' motions, it is clear that they attempt to spy on them. Thus, some cautions can be taken to prevent possible harm.

The present disclosure can also be used as a prediction control mechanism. For example, the AP can identify the sensing application and check whether it matches with the previously predicted signals. Such previous prediction can exist for any purpose in cognitive radio; for instance, to use spectrum more efficiently, resource allocation, etc. To predict spectrum, any methods shown in Aygül et al. can be used. On the other hand, if predicting the sensing application, the periodicity of the signal, which will provide information about the future spectrum, may be known. Therefore, it can be checked whether or not the predicted spectrum (e.g. predicted by Aygül et al method) matches the predicted spectrum, which is performed by the periodicity-based technique.

As another example, in the environment defined above, another sensing device or application can enter the area. First, it can identify and predict the existing sensing applications. If there are similar or same applications as itself, it can utilize these sensing signals for its sensing application and there is no need to generate new signals. Consequently, the required power is reduced and the interference may be reduced as well. Also, spectrum can be used more efficiently.

In summary, as shown above, the present disclosure is in no way limited to the initially mentioned spectrum (occupancy) prediction. However, the spectrum prediction is also one of the applications for which the present sensing application identification may be applied, as is provided below in an exemplary implementation. For spectrum occupancy prediction (but also for other purposes such as surveillance, threat and spying detection or the like) sensing application prediction may be used.

Spectrum Prediction

Figure 5:
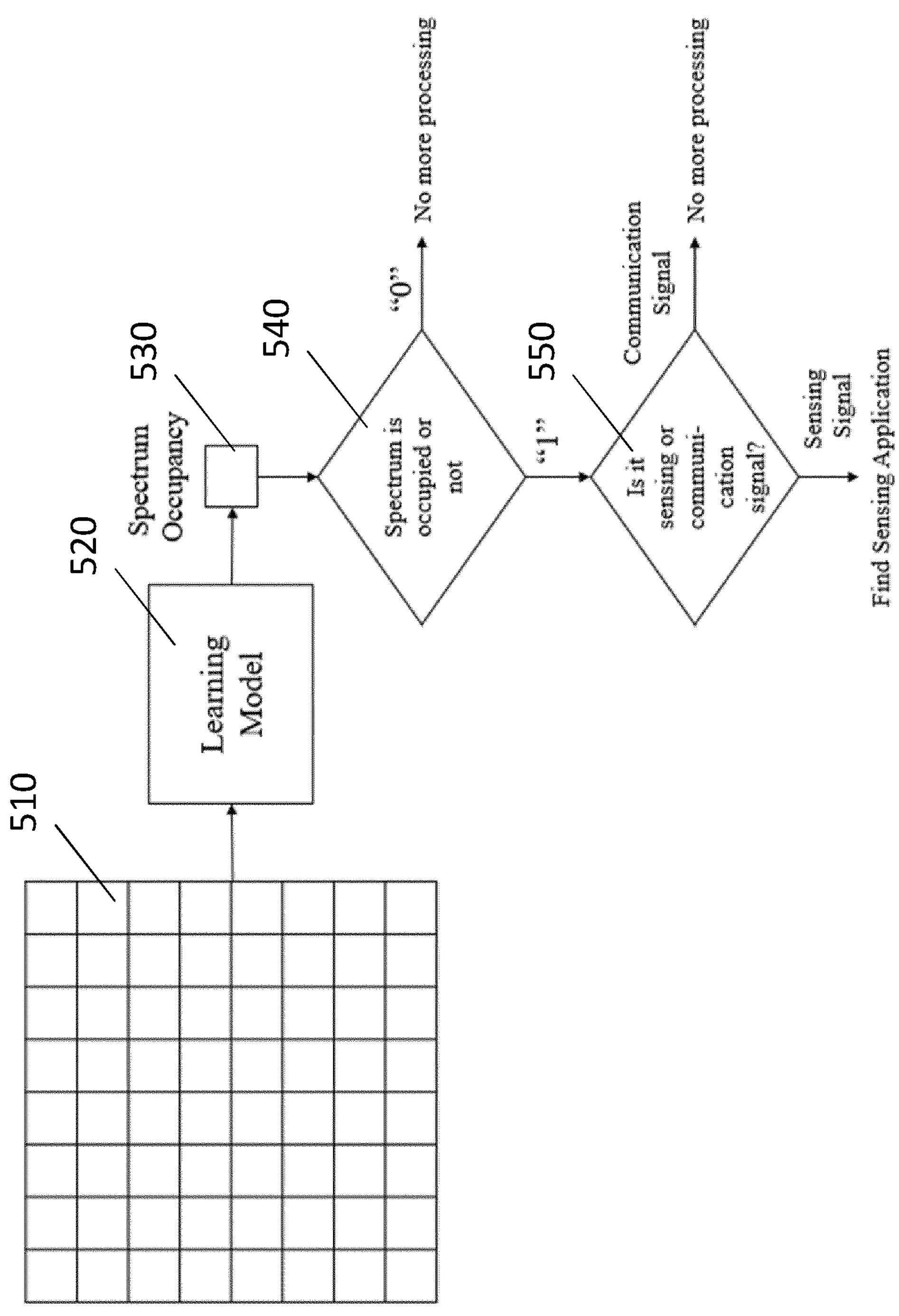
FIG. 5 is a block diagram of an exemplary sensing application prediction.

Sensing application prediction may be as important as sensing application identification. It has several advantages, which are detailed in the following section. Sensing application prediction has two steps. The first step is predicting the spectrum occupancy. For this, the techniques that are used in Aygül, M. A., Nazzal, M., Sağlam, M. I., da Costa, D. B., Ateş, H. F., & Arslan, H. (2021). Efficient Spectrum Occupancy Prediction Exploiting Multidimensional Correlations through Composite 2D-LSTM Models, Sensors 2021, 21, 135: https://dx.doi.org/10.3390/s21010135 (incorporated herein by reference and referred to as Aygül et al. in the following) can be used, but the applicable techniques are not limited to the particular techniques defined therein. If the spectrum is empty (available), it means that there will be no sensing application in the future. If it is full (occupied), it should be defined whether it is a sensing signal or any other signal such as a communication signal present in the spectrum. The features and techniques that are mentioned above to differentiate between the communication signal and sensing signal above can be used for this purpose. If it is a sensing signal, its application (application originating the sensing signal) is identified. To predict a sensing application, the techniques and features that are defined for sensing application identification can be used. The block diagram for this is shown in FIG. 5.

In particular, the input into the trained module 520 is a measurement of spectrum 510. In this exemplary drawing, the spectrum 510 is represented as a two dimensional time-frequency grid, as is usual for time-frequency resource-based systems such as Orthogonal Frequency Division Modulation (or Multiplex) or in general various other Frequency Division Multiplex (FDM) approaches. The trained module 520 in this exemplary implementation is a learning module such as a machine learning or deep learning module, trained for the specific task of spectrum occupancy detection. The result 530 of the trained module is prediction of spectrum occupancy for a particular spectrum part for a particular one time instance or for several following time instances. Based on this result in evaluation step 540, if the spectrum is not occupied (represented by binary zero "0" in this example), no further action is taken. If the spectrum is occupied (represented by binary one "1" in this example), it is decided whether the signal occupying the spectrum is a communication signal or a sensing signal. If the signal occupying the spectrum is a communication signal in evaluation step 550, no further processing is necessary at least in the context of the present disclosure, which focuses here on the identification of the sensing application. If the signal occupying the spectrum is a sensing signal in evaluation step 550, the sensing application which generated this signal is identified further.

Instead of first finding spectrum occupancy and then finding the sensing application, both can be performed with a learning algorithm, such as deep learning. Deep learning is capable of doing this joint work. The details of an exemplary joint spectrum occupancy and sensing application are provided below.

There are two stages; training and testing. In the training stage, first, the dataset is collected. This dataset comprises a set of spectrum measurements, binary occupancies of these measurements, and the class of the sensing application. After the training and testing, the inference phase (also referred to as production phase) corresponds to the actual operation of the trained module for the sensing application identification and/or prediction. It is noted that the present disclosure is not limited to any particular network modularity. For example, it is conceivable to perform the recognition of the application type (sensing/communication) in two steps as described above. This may be performed by two different and separately trained modules (e.g. two different neural networks or Long Short-Term Memory or the like). It may be also performed by mixing a machine learning (trained) module and a statistical algorithm. However, it is also possible to have a module trained to perform both, i.e., to decide based on the input whether the input is a communication signal or one of a predefined set of sensing applications. In the following the latter approach will be exemplarily discussed.

Before the training, the training data set can be obtained in various ways. For example, the binary spectrum occupancies may be obtained by thresholding the power spectral density (PSD) measurements (or other power or amplitude related measurements) with respect to a specific threshold. In some embodiments, the threshold is adjusted in accordance with the power of the thermal noise. The noise level may be determined by a measurement, or estimated as is known in the art. A margin of 3 dB may be considered, in addition, for determining the final threshold value to account for any unforeseen effects and variations. If the measured PSD in a certain frequency band is above (exceeds) this threshold, then this frequency band is reported as occupied. If on the other hand, the measured PSD in the frequency band is below or equal to the threshold, the frequency band is reported (determined) as not occupied.

After the collection of the measurements, the input dataset can be obtained in time, frequency, and space, as explained in Aygül et al. For the output, two different tasks may be learned. The first one is spectrum occupancy prediction and the second one is sensing application. Spectrum occupancy prediction can be represented by binary values with one unit. In other words, for each spectrum part, a binary value specifies whether or not this part of the spectrum is occupied. For sensing application identification, there will be several sensing applications possible, so the number of output units should be the same as the number of sensing applications to represent all of them. Here, note that if the spectrum is assumed occupied (or if there is any apriori information), only sensing applications as an output dataset can be used. Otherwise, spectrum occupancy can be used as a sensing application class. When a dataset is acquired, the machine can be trained according to the input and output dataset. Then, in the testing stage, spectrum occupancy prediction and its application can be found. Here, note that instead of spectrum occupancy, spectrum can be predicted. In that case, the output unit for the spectrum occupancy will be changed to spectrum prediction, e.g., binary to numeric.

Figures 6A, 6B:
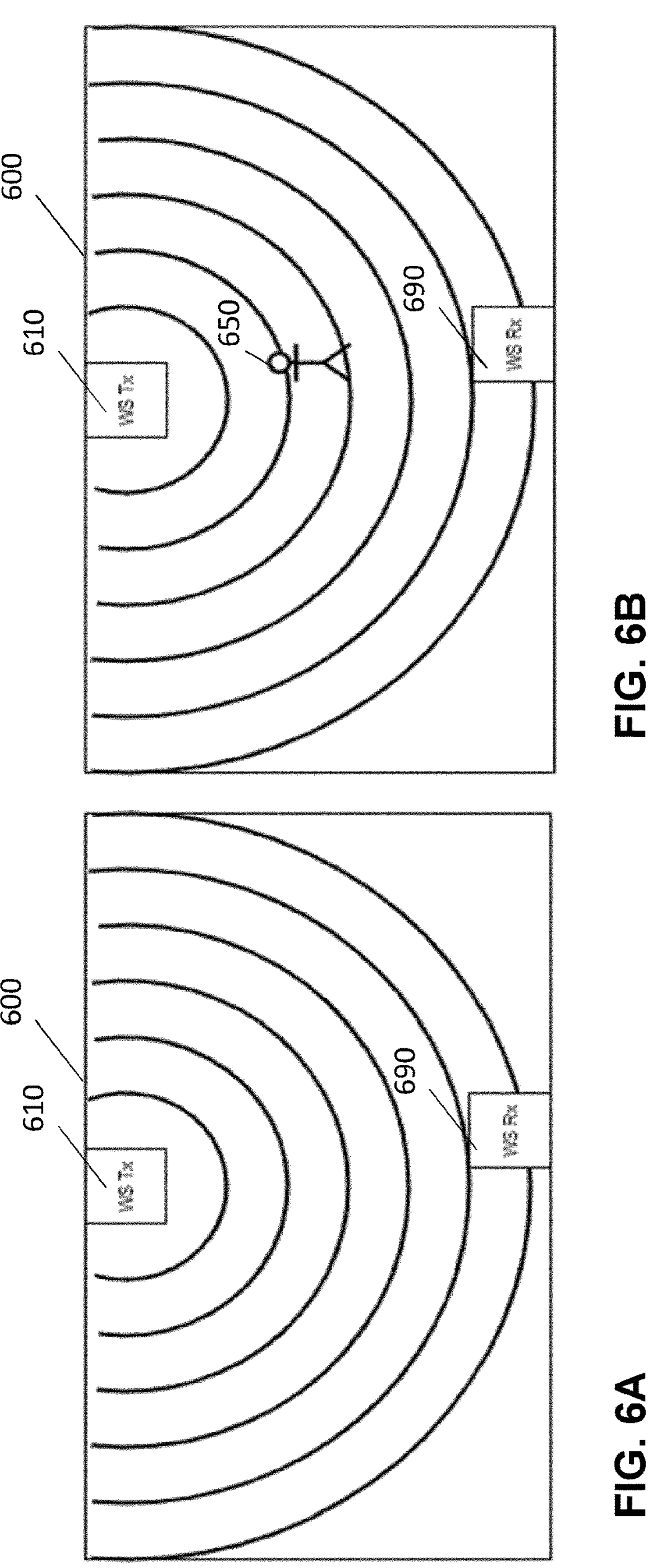
FIG. 6A is a schematic drawing illustrating a simple sensing scenarios in absence of objects to be detected.
FIG. 6B is a schematic drawing illustrating a simple sensing scenarios in presence of objects to be detected.

FIG. 6A and FIG. 6B shows an illustration of a generic sensing application. Here, wireless sensor (WS) transmitter (Tx) 610 is the wireless sensor transmitter and WS receiver (Rx) 690 is the wireless sensor receiver. The WS Tx and WS Rx are synchronized, and can coordinate with each other, either through wireless signalization or via a wired connection. The WS Tx 610 and the WS Rx 690 are located in a limited area, such as a room 600. The concentric circle portions illustrate the electromagnetic field (wireless sensing signal) generated by the WS Tx 610. As can be seen in the figure, the WS Rx 690 is in the range of the wireless sensing signal. As discussed above, the wireless sensing signal may be a sensing pulse or continuous signal such as radar or a sounding signal. However, it may be also reporting of a regular measurement in a packet form or the like.

FIG. 6A is only an example configuration of wireless sensing hardware. Other configurations could comprise more than one transmitters and/or more than one receivers, transceivers, etc. Here, the term transceiver denotes a receiver or a transmitter or a combination of both. Initially, the WS Tx 610 may transmits the sensing signals when there is nothing to be detected (there is no object in the monitored object size range), as shown in FIG. 6A. The WS Rx 690 receives these sensing signals and takes measurements, for example, CSI or any signal strength indicating measurements. Then, when there is something to be detected, which is shown as a stick man 650 in FIG. 6B, the changes in the measurement indicates that. In other words, the presence of the object 650 changes the channel and thus, the received signal, which can be detected at WS Rx 690. It is noted that this is only an example in which there are cooperating transmitter and receiver WS. However, the present disclosure is not limited thereto and instead of detecting signal transmitted from a certain transmitter located in a position different from the position of the receiver, some sensing applications may rely on a transceiver comprising co-located transmitter and receiver, such as a pulse radar in which case the signal detected is a signal reflected from the detected object.

Figure 8:
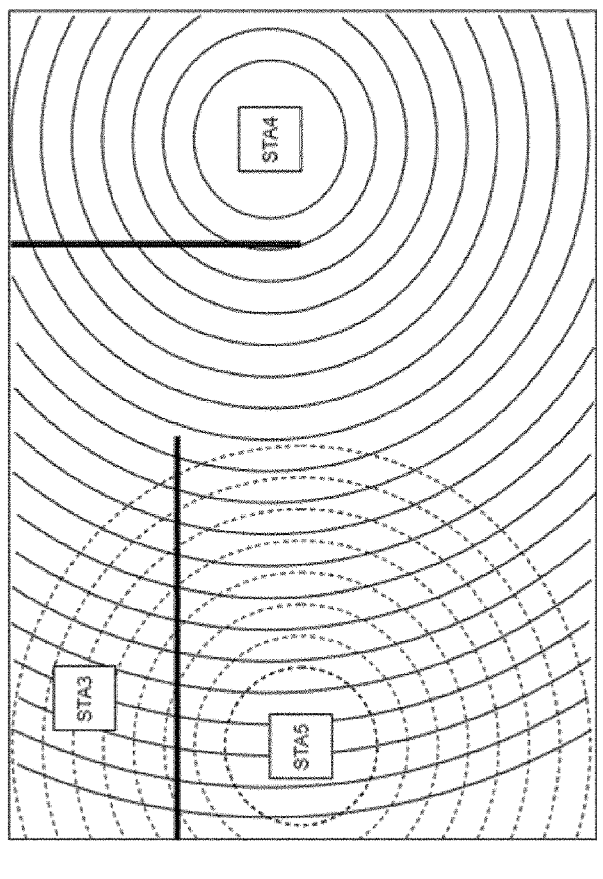
FIG. 8 is a schematic drawing illustrating a sensing scenario with multiple devices communicating and sensing via non line of sight.
Figure 7:
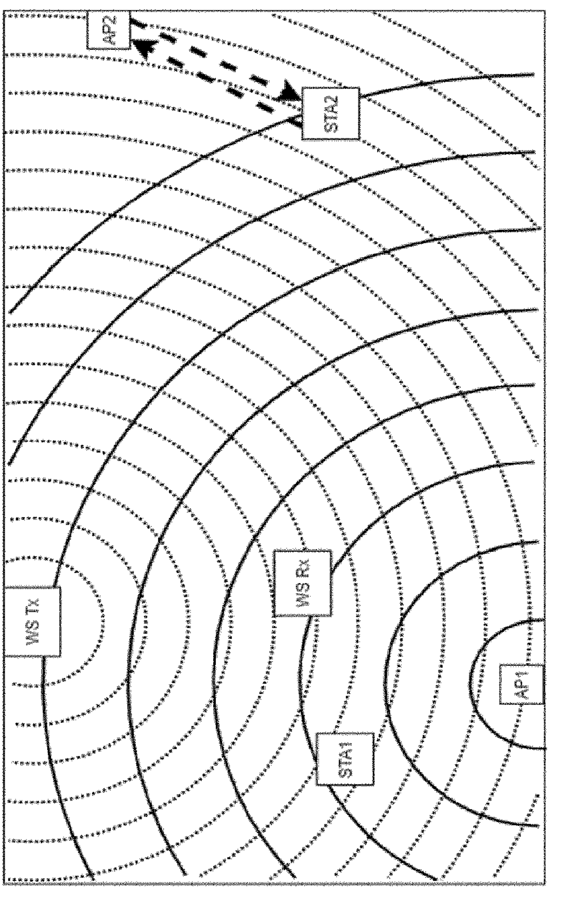
FIG. 7 is a schematic drawing illustrating a sensing scenario with multiple devices communicating and sensing via line of sight.

FIG. 7 and FIG. 8 show further different exemplary sensing scenarios. The different devices performing sensing and communication in the region can be solely sensing devices, shown as WS Tx and WS Rx. Alternatively, or in addition, the sensing may be performed between APs (or other network controllers/coordinators) and stations (STA)s, or between STAs and other STAs. At the same time, other network devices can be communicating. The sensing devices may be line of sight (LOS), as shown in FIG. 7, or non-line of sight (nLOS), as shown in FIG. 8. For example, in FIG. 7, a WS Tx transmits a first sensing signal (dotted line). An AP1 transmits another sensing signal (solid line). STA1 may receive the sensing signal from the AP1 whereas WS Rx may receive the sensing signal from the WS Tx. However, the STA1 may also use the sensing signal from WS Tx and the WS Rx may also receive the sensing signal from the AP1 in some scenarios. Here, by receiving, what is meant is detecting as present and possibly processing further, i.e. not merely receiving as a part of noise. Moreover, AP2 and STA2 are in communication with each other, i.e. exchange communication signal. All these devices are in LoS in this simplified example. Some or all of these devices may operate in the same or at least partially overlapping spectrum.

As shown in the figures, the sensing signals may have different periodicity (indicated by different density of the concentric circle portions illustrating the sensing signal). In this case, identifying the sensing applications without direct communication or coordination with another wireless device may be beneficial. In response to the detection of a sensing signal, the devices can use signals, which are suitable for them rather than transmitting their own sensing signals. For example, once the STA1 detects that WS Tx is transmitting a sensing signal, it may use the sensing signal in addition or alternatively to the sensing signal from the AP1. It is even possible that AP1 detects sensing signal from WS Tx and stops transmitting own sensing signal, since one sensing signal may be sufficient. Or, vice versa, WS Tx detects that AP1 transmits a sensing signals and stops own transmission of the sensing signal. As is clear to those skilled in the art, various implementations of coordination and adaption of the sensing environment may be provided once the sensing applications (signals from sensing applications) have been detected in an area.

FIG. 8 shows a scenario in which there is not necessarily a LOS between some or all of the devices. In the figure, in fact none of the devices STA3, STA4, and STA5 present in the sensing area has a LoS to the other devices. nevertheless, still, sensing signals may be received at the sensing signal receiving devices. E.g. STA5 has no LoS to STA3 and STA4, but may still receive their sensing signal. Thus, STA5 may decide to switch off the own signal and use the sensing signal of STA4 or STA3 or the like. Using the sensing application identification and prediction technique discussed above, devices can learn which sensing application the signals are for, predict their duration and future spectrum usage and either schedule their own signals such that there is no interference (resource allocation) or utilize these signals for their own sensing application.

In the above description, some particular examples were given. However, the present disclosure is not limited to those examples. Rather, variations and modifications may be advantageous for some scenarios. For example, any features that are different for sensing and communication signals can be used to differentiate them, such as frame structure, periodicity, resolution, RSS/RSSI values, or some features of the sensing that will be defined in the future standards, such as periodic channel access mechanisms, back-off behavior, special sensing sequences or waveforms, or the like. The RSS/RSSI can be used instead of PSD for detecting spectrum occupancy and/or for measurement of the signal to determine whether it is a communication or a sensing signal or to determine the sensing application which originated said signal. For example, the RSS/RSSI measurement is available effortlessly in most communication devices and can give a rough quantification of user activity, i.e., spectrum usage. The term "user" here refers more broadly to a particular application running on a device.

Some embodiments of the present disclosure may be used for military defense purposes or for civil applications such as home surveillance or home appliances or entertainment. For example, which sensing applications are being used by other parties can be learned. Besides that, based on the PSD value and application requirements, location of the sensors can be found. For example, if the sensing application is learned (this means that a sensing application is known and the trained module is trained to distinguish it), having a knowledge of RSS/RSSI value is possible, since different applications require different RSS/RSSI values. RSS/RSSI depends on distance between the transmitter and the receiver. Therefore, it is possible to at least approximately predict the location or relative location of the sensing device (e.g. transmitter).

There is a variety of deep learning (DL) techniques that can be employed in the present disclosure for spectrum occupancy prediction and/or sensing application detection, identification and/or prediction. Examples comprise multi layer perceptron (MLP), recurrent neural networks (RNN) such as long short-term memory (LSTM), or convolutional neural network (CNN), or the like. Statistical methods can also be used rather than DL techniques. Sensing signal identification and prediction are not necessarily done with only ML and DL techniques. Sensing application identification and prediction can be made in several domains such as time, frequency, space, or code domain, jointly or separately.

The advent of DL is to alleviate the need for human-based feature extraction/crafting/engineering. Thus, it is possible to apply the above method directly on real-world measurements (PSD or RSS/RSSI) without doing any feature extraction. Conversely, the "deep" attribute of the used ML may be reduced at the cost of adding more feature extraction. In an extreme case, one may totally avoid DL and use ML if it is possible to extract distinctive features. Deep in general means that more than one processing layers are employed, whereas machine learning is possible also with a single layer. In the training and designing the trained module, rather than augmenting the received signal in the shape of a vector to be fed to the classifier, other sorts of augmentation may still be considered. For example, they can be shaped as another two-dimensions (2D) grid (e.g. time-frequency grid).

Some Effects and Advantages

One of the advantages of the present disclosure may be provision of improved spectral efficiency. For sensing applications, there may not be a need to generate a new signal, since there may already be a signal that can be used for the sensing. Therefore, spectrum wastage can be avoided and the spectrum which is saved can be used for something else. Power efficiency may be another advantage of the sensing application detection and/or identification. Since additional signals may not need to be transmitted, less power will be wasted. This can be critical for IoT and other power constrained wireless sensing devices. Resource allocation may be facilitated with some embodiments described above. Existing WiFi standards do not have any control between inter network APs. Therefore, techniques for coordination between different APs are required to eliminate interference while utilizing the spectrum efficiently. However, by reducing the sensing signal transmission based on the sensing signal detection, identification and/or prediction, interference may also be reduced.

To help spectrum occupancy prediction, the knowledge of the periodicity of sensing signals may be used. If a signal is identified as a sensing signal, and its periodicity can be determined, then the future (near future) transmissions may be predicted and used for a more accurate spectrum occupancy prediction.

Learning the sensed information may also be performed. If we know which signals are sensing signals, we can process them and learn information about the environment simply by utilizing transmissions from other devices.

Blind signal analysis may be useful for (e.g., military) defense or civil applications: sensing signal information may be used for military reconnaissance. For example, it can be learnt what other parties want to sense and what they are sensing. This can be done by analyzing the sensing signals using blind signal analysis (or other methods). In communication, if a node is not an illegitimate node (such as eavesdropper) it may not be possible to use someone else's signal as the signals in communication are typically dedicated to individual users. However, in sensing, any kind of signal that satisfies the requirements of the sensing application may be used, as the signals in sensing typically do not carry any private/confidential data or information.

Blind signal analysis may be also used for commercial applications: Some embodiments of the present disclosure may be used to enable or facilitate CR and software-defined radio (SDR), public safety radio, spectral efficiency improvement, optimization of the operation for various networks sharing the spectrum, testing, and measurement of the communication and sensing devices. This can be done by analyzing the sensing signals using blind signal analysis (or other methods).

Any of the advantages above serve to ease the integration of multiple sensing and joint sensing and communication (JSC) devices into current and next generation wireless networks.

Figure 9:
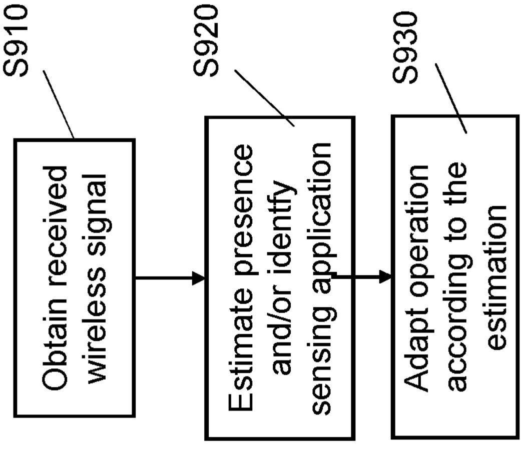
FIG. 9 is a flow diagram illustrating an exemplary method for sensing signal detection and/or identification.

As described above, in general terms, according to an embodiment, a method is provided for identifying a sensing application. A flow diagram of the method is illustrated in FIG. 9. The method comprises step 910 of obtaining a received wireless signal and estimating 920, by a trained module, presence of a (one or more in general) sensing signal in the received signal, the sensing signal being a signal generated by a sensing application. In this context, obtaining refers to receiving via wireless interface in some embodiments of the device, e.g., in devices which comprise also the transceiver front. However, the devices of the present disclosure may be also separated from the actual transceiver, and may merely have an interface to communicate (control and obtain/provide signals received/to be transmitted). For example, the obtaining may then be an obtaining from such interface or from storage/buffer or the like. The trained module may be an ML or a DL module, or another kind of trained module. In general, the present disclosure may replace the trained module by a module implementing a kind of statistic algorithm or other decision algorithm, e.g., based on conditions distinguishing between the sensing applications based on some pre-defined features (such as one or more of those mentioned above comprising periodicity, carrier, bandwidth, waveform, etc.). Combinations of the trained modules and some decision-based modules are conceivable.

In other words, instead or in combination with the trained (e.g., ML/DL) module, other kind of methods such as statistical methods or deterministic methods may be employed for the estimation. For example, if it is observed that a signal is repeating periodically, ML or DL methods may not be necessary to detect presence of such sensing signal. It can be determined deterministically whether sensing is taking place or not. Similarly, for sensing application identification, given a predefined set of features and their values for particular applications, identification may be performed. Still further, where sensing applications use specific header information for detecting network types, this or other header information may be detected and used deterministically to determine the identification of an application. There may be the drawback of defining the parameters (features and their values) and application sets for each environment. Thus, depending on the deployment scenario, trained modules may provide better results, for example in more complex scenarios, where deterministic or stochastic distinction is difficult or complex.

Moreover, the method of FIG. 9 comprises performing 930 wireless reception, transmission, or sensing based on the estimated presence of said sensing application. Some examples of such action taken in response to the estimation or according to the estimation comprise the following exemplary implementations.

Based on the presence or absence of the sensing signal at a plurality of measurement time instances, determine periodicity of the sensing signal. This may be performed by capturing the presence/absence detection of the sensing signal within the received signal and then by analyzing the past captured signal. It may be also performed by correlating the waveform of a specific sensing application with the received signal, which possibly comprises noise and interference from other signals. It may be performed by a trained module. The periodicity of the signal may be further used to improve spectrum occupancy prediction, e.g., as an additional input or feedback to the spectrum occupancy prediction. Based on the spectrum occupancy prediction, scheduling of the signal may be performed in a wireless device (STA, AP, WS, or the like). For example, if the spectrum occupancy prediction (e.g. based on the periodicity of the sensing signal identified) indicates that a certain part of a spectrum is to be used by the identified sensing application, the wireless device may decide to transmit signals (communication or sensing or both) in a different part of spectrum and/or at a different time instance (from that predicted for the sensing application). It is noted that the sensing application identification and/or the spectrum occupancy prediction may be performed in the same device which uses the results of the identification in some embodiments. However, there may be embodiments in which a first (e.g., controlling) device performs the spectrum occupancy prediction and/or the sensing application detection or identification. Such device may then broadcast the results (or multicast or just transmit) to one or more devices in the area. They may then adapt their behavior (e.g., channel access, sensing signal transmission or sensing signal reception and evaluation) accordingly.

In other words, the detected sensing application may be used to improve spectrum occupancy prediction. Moreover, the detected sensing application features may be used in scheduling. A device that has a knowledge of the presence (and prediction for future presence in certain resources) of a particular sensing application may schedule its data or sensing signal to avoid using the same frequency and/or bandwidth and/or time. Alternatively, or in addition, a device having prediction of the sensing signal sent by a certain transmitter may use the sensing signal for own sensing, e.g., for evaluation of presents of objects in the area or the like. In not encrypted applications, if the sensing application reports environment conditions or channel conditions, the reports may be read by a plurality of devices which detect and predict the presence of such signals. Alternatively or in addition, transmitters of sensing signals may stop transmitting sensing signals or decide to reduce the periodicity of own sensing signals when they have knowledge of a similar sensing application detected/identified in the same area (e.g., in the proximity).

In some exemplary implementations, the sensing application is an application generating the sensing signal with a pre-configured periodicity or as a continuous transmission signal. Such applications may have features (repetitive character and/or specific waveform possibly from the communications signals), which makes it possible to distinguish them easily from the communication signals. Thus, detection and identification of such sensing application signals may be performed with some reliability and used in any of the above mentioned exemplary scenarios.

The periodicity may be pre-configured at the sensing application transmitter, e.g., by a person (e.g., in health monitoring devices) or by the application or the like. When referring here to continuity, it is noted that the continuous signal is continuous subject to a minimum time resolution. For example, continuous signals may be on/off signal pattern or sinus pattern or the like, transmitted continuously—it does not mean that the signal must be constant. The minimum time resolution may depend on the hardware capabilities. In other words, even continuous transmissions typically have periodic character. Herein, the term continuous is used in the same way as in the art: by continuous what is meant is that there is no distinguishable gap in the sensing signal, like for radar chirp signals transmitted in one direction. Periodicity referred to above is in addition for cases when there is a pre-defined gap in time between the sensing signals (wave packets). Of course, the pre-defined gap may also have some variations subject to imperfect hardware or (at the receiver) wave propagation conditions.

In an exemplary implementation, the sensing application in one of a radar sensing, wireless sensing, wireless local area sensing, channel state information sensing.

Wireless sensing may comprise channel or spectrum sensing. Wireless local area sensing may comprise beamforming sensing. It is also noted that the term wireless sensing may be considered as more general and comprises any kind of sensing using wireless signal for sensing itself or for (possibly periodic) reporting of the sensing results. Such wireless sensing or wireless local area sensing may also comprise sensing using the Wi-Fi technology. This usage may be in terms of equipment (using STA or AP), frequency bands, frame designs, communication related measurements, such as CSI, CIR, CFR, RSS, RSSI, etc. Some examples of wireless sensing and wireless local area sensing are provided, e.g., in Yongsen Ma, Gang Zhou, and Shuangquan Wang. 2019. *WiFi Sensing with Channel State Information: ASurvey. ACM Comput. Surv.* 52, 3, Article 46 (June 2019), 36 pages. https://doi.org/10.1145/3310194.

In some exemplary implementations based on any of the above mentioned embodiments or examples, the estimating further comprises determining (e.g., identifying the application or the application type) the sensing application as one out of a plurality of predefined sensing applications. As mentioned above, the detection of presence of the sensing application and a more accurate identification of such application (or application type) may be performed jointly or separately. Here, the term identifying application is to be understood broadly. For instance, in some implementations, it may mean distinction between a predefined set of application types such as health/fitness/sleep monitoring on one hand and object presence/movement/velocity on the other hand. However, in some implementations, a finer distinction may be performed such as the one exemplified above in the detailed embodiments. It may be possible to further distinguish gesture detection signals from health or sleep monitoring or reporting signals or the line.

In an exemplary embodiment, the sensing application is an application generating the sensing signal with a pre-configured periodicity. Then, the determining of the sensing application comprises estimating the pre-configured periodicity based on the presence of the sensing signal estimated previously within the received wireless signal, and using the estimated pre-configured periodicity for identifying the sensing application out of the plurality of predefined sensing applications. The identification may be performed by a trained module (e.g., ML, DL). The presence (and maybe also periodicity) detection may be performed by a deterministic or statistic approach. However, as already mentioned above, other configurations are possible, comprising joint detection and identification by a trained module, two separate trained modules, or a pure statistic/deterministic approach.

For instance, the determining of the sensing applications performed based on one or more out of the characteristics: frame structure, bandwidth, sensing duration, sensing start time, sensing end time, and waveform. Said one or more characteristics differ for at least two among the plurality of predefined sensing applications. Then it is possible to perform some estimation of the identification of the present application. The characteristics refer to features as exemplified in the above embodiments, comprising, e.g., quantifiable parameters, of which the values differ for at least two applications.

As mentioned above, the presence detection and identification may be performed sequentially. In such case, in an embodiment, said determining of the sensing application as one out of the plurality of predefined sensing applications:

is performed if the presence of the sensing signal in the received wireless signal is acknowledged by the estimating step; or is not performed if the presence of the sensing signal in the received wireless signal is not acknowledged by the estimating step.

This has been already illustrated with reference to FIG. 5. In particular, in an exemplary implementation, the obtaining the received wireless signal comprises measuring one or more of power density spectrum, received signal strength or received signal strength indicator. The method further comprises determining, by the trained model, presence or absence of a communication or sensing signal in the received wireless signal. If a communication signal or a sensing signal is determined to be present in the received wireless signal, the estimating whether or not the signal is a sensing signal is performed. If the signal is a sensing signal, determining the sensing application as one out of a plurality of predefined sensing applications is performed.

It is noted that although the example described with reference to FIG. 5 showed binary occupancy, in general, a soft-value may be used for occupancy detection/prediction. Such soft value may express reliability of the occupancy prediction. If absence of a sensing signal is determined, the method may comprise bypassing the estimation (identification) step. If the signal is a communication signal, the method may further comprise bypassing the determination of the application identification. In addition or alternatively, if the signal is a communication signal, the method may comprise identification of the communication signal according to any known methods in the art.

As mentioned above, in some embodiments, the determining the sensing application and the estimating of the presence are performed jointly by the trained module.

In some exemplary implementations, based on the result of the estimating step, predicting future occupancy of resources by the sensing application may be performed. The prediction may be done by a trained module or by deterministically assuming certain periodicity or by mixture of both. The predictor can be changed based on the situation. If there are many sensing applications transmitting, then it may be better to use machine learning. Otherwise, parameter-based prediction may perform better in simpler scenarios with well-distinguishable sensing applications.

In any of the above embodiments and examples, the performing wireless reception, transmission or sensing may comprise scheduling of the wireless reception, transmission or sensing in resources which are predicted as not occupied by the sensing application. In addition or alternatively, the performing wireless reception, transmission or sensing comprises deciding whether or not to transmit a sensing signal based on the results (presence/absence and/or identification) of the estimating step, and performing or not performing the sensing depending on the deciding step.

Thus, own usage of the sensing signal based on the sensing identification may be performed. Such own usage uses the knowledge of the presence and types of sensing application signals to decide whether to transmit own sensing signals or utilize the available signals, as explained above already. Within a network, this can be used to reduce sensing traffic by coordinating with other devices to use the reduced or even minimum number of sensing transmissions to serve the sensing applications.

Figure 10:
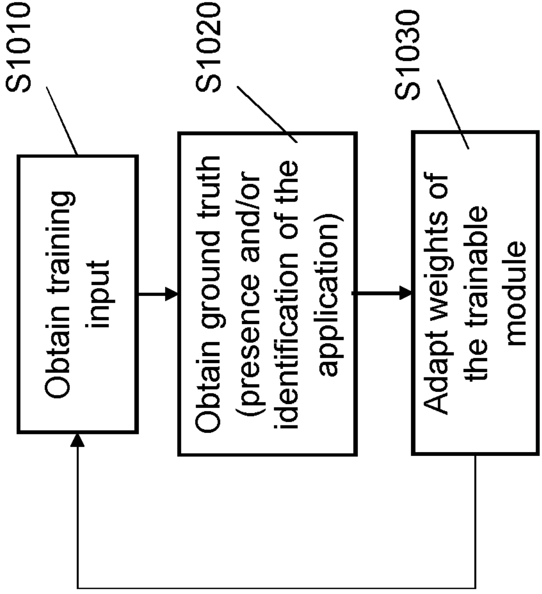
FIG. 10 is a flow diagram illustrating an exemplary method for training of a module for sensing signal detection and/or identification.

In addition to the above mentioned approaches to detection and identification of the sensing application, the training methods and devices for training the module used for the detection/identification are provided. For example, as illustrated in FIG. 10, method is provided for training a module for identifying a sensing application. The method comprises obtaining a received wireless signal in step 1010 and obtaining the ground truth in step 1020. Ground truth in this embodiment may be the decision on presence or absence of a sensing signal, when a module for detecting presence or absence is provided. Ground truth in another embodiment may be the identification of application originating the sensing signal, when a module for identification (or for both presence detection and identification) is trained. The method further comprises inputting to the module: the obtained representation of a received wireless signal (e.g., RSSI or other measurement representing signal or its characteristics) and one of or both a desired indication of presence or absence of a sensing signal in the representation and a desired indication of a sensing application generating the sensing signal. After inputting the training pair, the method comprises modifying 1030 at least one parameter of the module in accordance with the input. Such approach may be repeated for a plurality (possibly a large amount) of training data (training pairs in supervised learning). It is noted that this training method is only exemplary and that other approaches such as unsupervised learning may be applied as well.

It is noted that although embodiments and examples of the present disclosure were provided in terms of a method above, the corresponding device providing the functionality described by the methods are also provided. For example, a device is provided for identifying a sensing application. The device may comprise a processing circuitry which is configured to perform step according to any of the above mentioned methods. For example, the processing circuitry may be configured to obtain a received wireless signal and to estimate presence of a sensing signal in the received signal, the sensing signal being a signal generated by a sensing application. The device may further comprise a transceiver for performing wireless reception, transmission or sensing based on the estimated presence of said sensing application. Alternatively to the transceiver, the processing circuitry may control an external transceiver to perform wireless reception, transmission or sensing based on the estimated presence of said sensing application.

Figure 11:
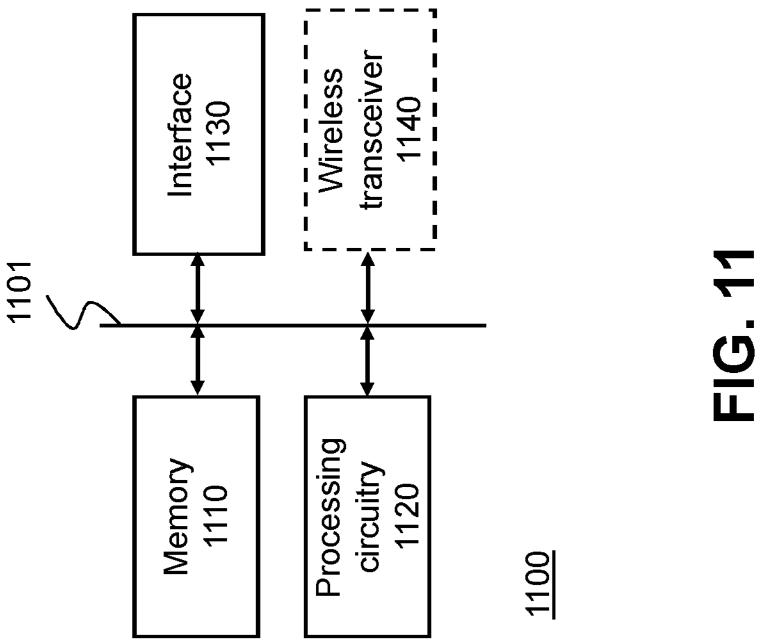
FIG. 11 is a block diagram illustrating an exemplary apparatus for sensing signal detection and/or identification.

FIG. 11 shows an exemplary device 1100, which may implement some embodiments of the present disclosure. For example, the device may be the device for sensing application detection or identification. Such a device may comprise memory 1110, processing circuitry 1120, a wireless transceiver 1140, and possibly a user interface 1130. The device may be, for instance a (part of) a base station or a terminal/STA, or another device as mentioned above.

The memory 1110 may store the program, which may be executed by the processing circuitry 1120 to perform steps of any of the above-mentioned methods. The processing circuitry may comprise one or more processors and/or other dedicated or programmable hardware. The wireless transceiver 1140 may be configured to receive and/or transmit wireless signals. The transceiver 1140 may comprise also baseband processing which may detect, decode and interpret the data according to some standard or predefined convention. However, this is not necessary and devices with only sensing applications may implement only the lower one or two protocol layers. For example, the transceiver may be used to perform measurement, communicate with other devices such as base stations and/or terminals. The device 1100 may further comprise a user interface 1130 for displaying messages or status of the device, or the like and/or for receiving a user's input. A bus 1101 interconnects the memory, the processing circuitry, the wireless transceiver, and the user interface.

Figure 12:
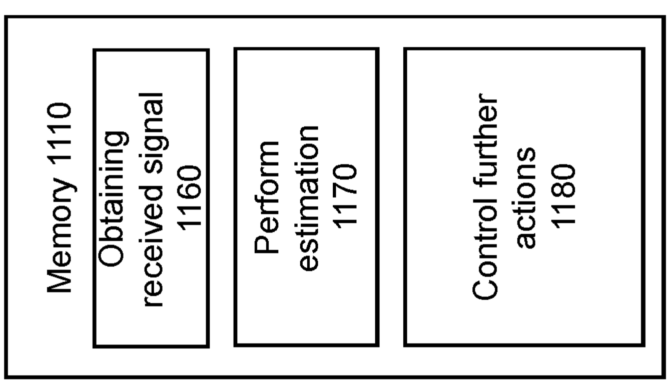
FIG. 12 is a block diagram illustrating an exemplary apparatus training a module for sensing signal detection and/or identification.

FIG. 12 shows an example of the memory 1110, comprising a module 1160 for obtaining the received signal, a module 1170 for the above mentioned estimation ad a module 1180 for controlling the transceiver 1140 to adapt the wireless reception, transmission or sensing based on the estimated presence of said sensing application. These modules 1160-1180 may be fetched from the memory and executed by the processing circuitry 1120.

The above examples are not to limit the present disclosure. There are many modifications and configurations which may be used in addition or alternatively, as will be briefly described below.

Similarly, a device is provided for training a module for identifying a sensing application, the device comprising a processing circuitry configured to: input to the module: a representation of a received wireless signal and one of or both a desired indication of presence or absence of a sensing signal in the representation and a desired indication of a sensing application generating the sensing signal; and modify at least one parameter of the module in accordance with the input.

This present disclosure can be used in any kind of device that is used for wireless sensing. For instance, health monitoring, activity classification, gesture recognition, people counting, through the wall sensing, emotion recognition, attention monitoring, keystrokes recognition, drawing in the air, imaging, step counting, speed estimation, sleep detection, traffic monitoring, smoking detection, metal detection, sign language recognition, humidity estimation, wheat moisture detection, fruit ripeness detection, sneeze sensing, etc. Besides these applications, the embodiments of the present disclosure can be used in JSC technologies. This disclosure can also be used for sensing applications to support communication applications, like obstacle tracking for beam management. Therefore, devices that can utilize this disclosure could be smart homes/offices/cities/factories/etc. devices, like electrical kitchen appliances, television sets, smart bus stops, smart office equipment (printers, etc.), lighting systems, WLAN and WiFi devices, etc. Other devices could be stand-alone wireless sensors, such as heart-rate monitors, motion detectors, smart watches, etc. Besides these applications, the disclosure can be used for military services such as enemy sensors, the existence of enemy devices and what they are sensing can be learned and some precaution can be taken. This disclosure can especially be used in network controllers and managing devices, such as APs, BSs, edge nodes, enhanced nodes, etc. for technologies such as CR, reconfigurable radio systems, etc.

In some embodiments, the sensing signal is a continuous or periodic radar signal. In some embodiments, the sensing signal is a signal generated by a sensing application supporting wireless sensing, wireless local area sensing, and/or non-invasive medical sensing.

In general, wireless sensing is performed by measuring some features of a received signal. On the other hand, communication is performed by detecting from the received signal information encoded therein at the transmitter. In communication, some features of the received signal are used to perform the detection (such as demodulation and decoding).

There are numerous frame designs, waveforms, and transmission schemes that are being used for wireless sensing and JSC. Their use depends on the method of wireless sensing that is being used. For example, wireless sensing may be done in one of the following ways:

Wireless fingerprinting: Measurements are taken, either at different locations or with a stationary sensor, while different actions are taking place. These measurements may be processed and stored beforehand in a look-up table with their respective locations/actions.

Radar-based sensing: Sensing signals are transmitted with a certain rate and duty cycle and the reflections of these signals are processed to learn information about the object, such as its range, size, relative velocity, material, etc. In radar applications, waveforms or frame designs with high auto-correlation properties and low peak to average power ratio (PAPR), due to high transmit powers and very low receive powers) are preferred. Common waveforms are pulse waveforms or frequency modulated continuous wave waveforms. Frame design and transmission mechanism-based factors which may affect radar performance are the transmit power, duty cycle, pulse repetition frequency, frequency modulation, carrier frequency, auto-correlation properties, bandwidth, signal period, angle of departure, beamwidth, beam sweep rate, or the like. Environment factors which may affect radar performance are the amount of clutter, physical properties of the object (size, material, etc.), location of the object, atmospheric conditions (e.g.: humidity), or the like. Spectrum conditions which may affect the radar performance are the occupancy, number of users, interference, channel conditions (time/frequency selective), or the like.

Pattern-based sensing: This is similar to wireless fingerprinting, except that the measurements are not prestored in a look-up table, but rather a pattern is extracted from them, which represents the action/object to be detected, and the pattern is used to detect the action/object in future measurements. Example frame designs and waveforms are the physical protocol data unit (PPDU) packet in Wi-Fi and OFDM and orthogonal time frequency space (OTFS) waveforms. Frame design and transmission mechanism-related factors which may affect the performance of sensing are the sensing/training/pilot sequence, placement of these sequences (in which subcarriers), bandwidth, carrier frequency, packet length, packet repetition frequency, angle of departure, beamwidth, beam sweep rate, RF impairments, or the like. Environment-related factors which may affect the sensing performance are a number of mobile objects in the area (environment stationarity), a number of users/objects to be detected, nature of the motion/action/activity to be detected (large/small displacement, slow/fast-moving or the like), atmospheric conditions, physical properties of the object/user to be detected, or the like. Spectrum conditions which may affect the radar performance are the occupancy, number of users, interference, channel conditions (time/frequency selective), or the like.

In general, the present disclosure is not limited to the above-mentioned three types of sensing.

The features of the received signal measured by the wireless sensing may comprise, but are not limited to, time-of-flight, RSSI, CSI, or the like. Transmitted signal parameters affecting the performance of the wireless sensing are, but not limited to, the transmitted frequency, bandwidth, waveform, power, training or sensing sequence, auto-correlation capabilities, pilots, beam angle and width (if beamforming is taking place), duty cycle, transmission rate, or the like.

It is desired that wireless sensing, communication, and JSC devices operate/coexist peacefully in the same (or at least partially overlapping) frequency bands with a maximum efficiency, in terms of spectrum usage, power, or the like, and sensing and communication performance, in terms of throughput, reliability, sensing accuracy, or the like. This may be facilitated by detecting and/or identifying the sensing signals as described herein.

Implementations in Software and Hardware

The methodologies described herein may be implemented by various means depending on the application. For example, these methodologies may be implemented in hardware, operation system, firmware, software, or any combination of two or all of them. For a hardware implementation, any processing circuitry may be used, which may comprise one or more processors. For example, the hardware may comprise one or more of application-specific integrated circuits (ASICs), digital signal processors (DSPs), digital signal processing devices (DSPDs), programmable logic devices (PLDs), field-programmable gate arrays (FPGAs), processors, controllers, any electronic devices, and/or other electronic circuitry units or elements designed to perform the functions described above.

If implemented as program code, the functions performed by the transmitting apparatus (device) may be stored as one or more instructions or code on a non-transitory computer-readable storage medium such as the memory 610 or any other type of storage. The computer-readable media comprises physical computer storage media, which may be any available medium that can be accessed by the computer, or, in general by the processing circuitry 620. Such computer-readable media may comprise RAM, ROM, EEPROM, optical disk storage, magnetic disk storage, semiconductor storage, or other storage devices. Some particular and non-limiting examples comprise compact disc (CD), CD-ROM, laser disc, optical disc, digital versatile disc (DVD), Blu-ray (BD) disc, or the like. Combinations of different storage media are also possible—in other words, distributed and heterogeneous storage may be employed.

The embodiments and exemplary implementations mentioned above show some non-limiting examples. It is understood that various modifications may be made without departing from the claimed subject matter. For example, modifications may be made to adapt the examples to new systems and scenarios without departing from the central concept described herein.

SELECTED EMBODIMENTS AND EXAMPLES

Summarizing, some embodiments in the present disclosure relate to sensing application identification. In particular, a wireless signal is obtained to be further processed. Then, presence of a sensing signal in the received signal is estimated, the sensing signal being a signal generated by a sensing application. Based on the estimation of the sensing signal, wireless reception, transmission or sensing is then performed. The sensing application detection and/or identification may be performed by a trained module such as machine learning-based module. The wireless reception, transmission or sensing performed according to the result of the estimation may further comprise channel access, resource allocation, utilization of the detected sensing signal for own sensing purposes, or the like.

According to an embodiment, a method is provided for identifying a sensing application comprising the steps of: obtaining a received wireless signal, estimating, by a trained module, presence of a sensing signal in the received signal, the sensing signal being a signal generated by a sensing application, and performing wireless reception, transmission or sensing based on the estimated presence of said sensing application.

For example, the sensing application is an application generating the sensing signal with a pre-configured periodicity or as a continuous transmission signal.

For example, the sensing application in one of a radar sensing, wireless sensing, wireless local area sensing, channel state information sensing.

In some exemplary embodiments, the estimating further comprises determining the sensing application as one out of a plurality of predefined sensing applications.

According to an exemplary implementation, the sensing application is an application generating the sensing signal with a pre-configured periodicity, the determining of the sensing application comprises estimating the pre-configured periodicity based on the presence of the sensing signal estimated previously within the received wireless signal, and using the estimated pre-configured periodicity for identifying the sensing application out of the plurality of predefined sensing applications.

For instance, the determining of the sensing applications performed based on one or more out of the characteristics: frame structure, bandwidth, sensing duration, sensing start time, and sensing end time, and waveform; and said one or more characteristics differ for at least two among the plurality of predefined sensing applications.

For instance, the determining of the sensing applications is performed based on one or more out of the characteristics: bandwidth, beamwidth, transmission power, and sensing rate. Moreover, said one or more characteristics differ for at least two among the plurality of predefined sensing applications. These characteristics correspond to some operational parameters of the sensing application and, as mentioned above, provide a suitable distinction between various different applications. Based on the desired applications to be distinguished, one of the characteristics or a combination of two or more or all of these four characteristics may be used. Such characteristics may be negotiated at the beginning (and, optionally also during) the sensing session.

In some embodiments, said determining the sensing application as one out of the plurality of predefined sensing applications: is performed if the presence of the sensing signal in the received wireless signal is acknowledged by the estimating step; and is not performed if the presence of the sensing signal in the received wireless signal is not acknowledged by the estimating step.

In some exemplary implementations, the obtaining the received wireless signal comprises measuring one or more of power density spectrum, received signal strength or received signal strength indicator, determining, by the trained model, presence or absence of a communication or sensing signal in the received wireless signal, if a communication signal or a sensing signal in determined to be present in the received wireless signal, estimating whether or not the signal is a sensing signal, and if the signal is a sensing signal, determining the sensing application as one out of a plurality of predefined sensing applications.

For example, the determining the sensing application and the estimating of the presence are performed jointly by the trained module.

The method may further comprise, based on the result of the estimating step, predicting future occupancy of resources by the sensing application.

For example, the performing wireless reception, transmission or sensing comprises scheduling of the wireless reception, transmission or sensing in resources which are predicted as not occupied by the sensing application.

For example, the performing wireless reception, transmission or sensing comprises deciding whether or not to transmit a sensing signal based on the results of the estimating step, and performing or not performing the sensing depending on the deciding step.

According to an embodiment, a method is provided for training a module for identifying a sensing application, the method comprising: inputting to the module: a representation of a received wireless signal and one of or both a desired indication of presence or absence of a sensing signal in the representation and a desired indication of a sensing application generating the sensing signal; and modifying at least one parameter of the module in accordance with the input.

According to an embodiment, a device is provided for identifying a sensing application, the device comprising: a processing circuitry configured to: obtain a received wireless signal, and estimate presence of a sensing signal in the received signal, the sensing signal being a signal generated by a sensing application; and a transceiver for performing wireless reception, transmission or sensing based on the estimated presence of said sensing application.

According to an embodiment, a device is provided for training a module for identifying a sensing application, the device comprising a processing circuitry configured to: input to the module: a representation of a received wireless signal and one of or both a desired indication of presence or absence of a sensing signal in the representation and a desired indication of a sensing application generating the sensing signal; and modify at least one parameter of the module in accordance with the input.

Moreover, the corresponding methods are provided comprising steps performed by any of the above mentioned processing circuitry implementations.

Still further, a computer program is provided, stored on a non-transitory medium, and comprising code instructions which when executed by a computer or by a processing circuitry, performs steps of any of the above-mentioned methods.

According to some embodiments, the processing circuitry and/or the transceiver is embedded in an integrated circuit, IC.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

The invention claimed is:

1. A method for identifying a sensing application comprising:

obtaining a received wireless signal, estimating, by a trained model, presence of a sensing signal in the received wireless signal, the sensing signal being a signal generated by a sensing application, based on the result of the estimating step, predicting future occupancy of resources by the sensing application, and performing wireless reception, transmission or sensing based on the estimated presence of the sensing application, wherein the performing wireless reception, transmission or sensing comprises scheduling of the wireless reception, transmission or sensing in resources which are predicted as not occupied by the sensing application.

2. The method according to claim 1, wherein the sensing application is an application generating the sensing signal with a pre-configured periodicity or as a continuous transmission signal.

3. The method according to claim 1, wherein the sensing application is one of a radar sensing, wireless sensing, wireless local area sensing, or channel state information sensing.

4. The method according to claim 1, wherein the estimating further comprises determining the sensing application as one of a plurality of predefined sensing applications.

5. The method according to claim 4, wherein the sensing application is an application generating the sensing signal with a pre-configured periodicity, the determining of the sensing application comprises:

estimating the pre-configured periodicity based on the presence of the sensing signal estimated previously within the received wireless signal, and using the estimated pre-configured periodicity for identifying the sensing application of the plurality of predefined sensing applications.

6. The method according to claim 4, wherein the determining of the sensing applications is performed based on one or more of the following characteristics:

frame structure, bandwidth, sensing duration, sensing start time, sensing end time, and/or waveform; and the one or more characteristics differ between at least two of the plurality of predefined sensing applications.

7. The method according to claim 4, wherein the determining of the sensing applications is performed based on one or more of the following characteristics:

bandwidth, beamwidth, transmission power, and/or sensing rate, the one or more characteristics differ between at least two of the plurality of predefined sensing applications.

8. The method according to claim 4, wherein the determining the sensing application as one of the plurality of predefined sensing applications:

is performed if the presence of the sensing signal in the received wireless signal is acknowledged by the estimating step; or is not performed if the presence of the sensing signal in the received wireless signal is not acknowledged by the estimating step.

9. The method according to claim 4, wherein the determining the sensing application and the estimating of the presence are performed jointly by the trained model.

10. The method according to claim 1, wherein:

the obtaining the received wireless signal comprises:

measuring one or more of power density spectrum, received signal strength and/or received signal strength indicator, determining, by the trained model, presence or absence of a communication signal or sensing signal in the received wireless signal, if a communication signal or a sensing signal is determined to be present in the received wireless signal, estimating whether or not the communication signal or sensing signal present in the received wireless signal is a sensing signal, and if the signal is a sensing signal, determining the sensing application as one of the plurality of predefined sensing applications.

11. The method according to claim 1, wherein the performing wireless reception, transmission or sensing comprises deciding whether or not to transmit a sensing signal based on the results of the estimating step, and performing or not performing the sensing depending on the deciding step.

12. The method according to claim 1, further comprising training of the trained module which includes:

inputting to the model: a representation of a received wireless signal and one of or both of a desired indication of presence or absence of a sensing signal in the representation and/or a desired indication of a sensing application generating the sensing signal; and modifying at least one parameter of the model in accordance with the input.

13. A device for identifying a sensing application, the device comprising:

a processing circuitry configured to:

obtain a received wireless signal, and estimate presence of a sensing signal in the received signal, the sensing signal being a signal generated by a sensing application;

based on the result of the estimating step, predict future occupancy of resources by the sensing application, and a transceiver for performing wireless reception, transmission or sensing based on the estimated presence of the sensing application, wherein the performing wireless reception, transmission or sensing comprises scheduling of the wireless reception, transmission or sensing in resources which are predicted as not occupied by the sensing application.

14. The device according to claim 13 the processing circuitry is further configured to:

train a module comprising:

input to the model: a representation of a received wireless signal and one of or both of a desired indication of presence or absence of a sensing signal in the representation and/or a desired indication of a sensing application generating the sensing signal; and modify at least one parameter of the model in accordance with the input.

* * * * *